US010322764B2

(12) United States Patent
Thomas

(10) Patent No.: US 10,322,764 B2
(45) Date of Patent: Jun. 18, 2019

(54) MOUNTING ASSEMBLY

(71) Applicant: John Curtis Thomas, Bainbridge Island, WA (US)

(72) Inventor: John Curtis Thomas, Bainbridge Island, WA (US)

( * ) Notice: Subject to any disclaimer, the term of this patent is extended or adjusted under 35 U.S.C. 154(b) by 61 days.

(21) Appl. No.: 15/475,536

(22) Filed: Mar. 31, 2017

(65) Prior Publication Data
US 2017/0284433 A1 Oct. 5, 2017

Related U.S. Application Data

(60) Provisional application No. 62/316,185, filed on Mar. 31, 2016.

(51) Int. Cl.
| | |
|---|---|
| *B62J 9/00* | (2006.01) |
| *F16B 1/00* | (2006.01) |
| *F16B 2/00* | (2006.01) |
| *F16B 11/00* | (2006.01) |
| *F16M 13/02* | (2006.01) |
| *F16B 5/06* | (2006.01) |
| *F16M 11/04* | (2006.01) |
| *F16M 11/14* | (2006.01) |

(Continued)

(52) U.S. Cl.
CPC .............. *B62J 9/003* (2013.01); *F16B 2/005* (2013.01); *F16B 5/0642* (2013.01); *F16C 11/106* (2013.01); *F16M 11/041* (2013.01); *F16M 11/14* (2013.01); *F16M 13/02* (2013.01); *F16M 13/022* (2013.01); *B62J 2099/0033* (2013.01); *F16B 5/0635* (2013.01); *F16B 7/1418* (2013.01); *F16B 11/006* (2013.01); *F16B 2001/0035* (2013.01)

(58) Field of Classification Search
CPC ............. H04M 1/00; B60R 2011/0059; B60R 2011/005–0063; B60R 2011/0085–0091
USPC ........................................................ 224/553
See application file for complete search history.

(56) References Cited

U.S. PATENT DOCUMENTS

| | | | |
|---|---|---|---|
| 3,388,677 A | 6/1968 | Mackay | |
| 4,832,299 A * | 5/1989 | Gorton ..................... | A61G 7/05 248/231.71 |

(Continued)

OTHER PUBLICATIONS

RAM X-Grip for Phones and Tablets, accessed on-line Feb. 15, 2018. https://www.rammount.com/products/x-grip, 5 pages.

(Continued)

*Primary Examiner* — Brian D Nash
(74) *Attorney, Agent, or Firm* — Meunier Carlin & Curfman LLC

(57) ABSTRACT

Various implementations include a spring biased mounting assembly. The mounting assembly includes a clamp plate with engagement arms extending therefrom and a base plate. The base plate is disposed between the clamp plate and distal ends of the engagement arms. The distal ends of the engagement arms are biased toward a first surface of the base plate. An object, such as a hand held electronic computing device, may be secured between the base plate and the distal ends of the engagement arms. The spring force may be provided by the clamp plate itself (e.g., a spring steel clamp plate) or by a separate spring (e.g., one or more helical springs, leaf springs, or a spring steel plate) disposed between the clamp plate and the base plate.

35 Claims, 19 Drawing Sheets

(51) Int. Cl.
*F16C 11/10* (2006.01)
*F16B 7/14* (2006.01)
*B62J 99/00* (2009.01)

(56) References Cited

U.S. PATENT DOCUMENTS

| | | | |
|---|---|---|---|
| 5,069,433 A | 12/1991 | Womack | |
| 5,179,590 A * | 1/1993 | Wang | B60R 11/0241 224/482 |
| 5,253,292 A * | 10/1993 | Fluder | H04M 1/04 379/426 |
| 5,362,025 A * | 11/1994 | Trom | F16M 11/041 248/187.1 |
| 5,457,745 A * | 10/1995 | Wang | B60R 11/0241 379/426 |
| 5,615,258 A * | 3/1997 | Ho | B60R 11/0241 379/446 |
| 5,769,369 A * | 6/1998 | Meinel | B60N 3/001 108/45 |
| 5,791,609 A * | 8/1998 | Hankins | F16M 13/02 248/124.1 |
| 5,836,563 A * | 11/1998 | Hsin-Yung | B60R 11/0241 248/316.4 |
| 5,903,645 A | 5/1999 | Tsay | |
| 6,073,318 A * | 6/2000 | Phillips | A45F 5/02 24/3.11 |
| 6,229,891 B1 * | 5/2001 | Chen | B60R 11/0241 379/446 |
| 6,285,758 B1 * | 9/2001 | Lu | B60R 11/0241 379/446 |
| 6,665,524 B1 * | 12/2003 | Niemann | H04B 1/3888 248/309.1 |
| 7,080,812 B2 * | 7/2006 | Wadsworth | B60R 11/02 248/316.1 |
| D571,278 S | 6/2008 | Carnevali | |
| 7,418,097 B2 * | 8/2008 | Chang | H04M 1/06 379/446 |
| 7,441,981 B2 * | 10/2008 | Crain | E06C 7/14 248/124.1 |
| 7,475,858 B2 * | 1/2009 | Kalis | B60R 11/0258 248/205.5 |
| 7,669,816 B2 * | 3/2010 | Crain | G01C 15/00 248/183.3 |
| 7,712,720 B1 | 5/2010 | Cheng et al. | |
| 7,920,905 B2 * | 4/2011 | Bury | B60R 11/0241 379/445 |
| 8,066,241 B2 * | 11/2011 | Yu | F16M 11/041 248/286.1 |
| 8,091,850 B2 | 1/2012 | Carnevali | |
| 8,186,636 B2 | 5/2012 | Carnevali | |
| 8,235,334 B1 * | 8/2012 | Kobal | F16M 11/041 248/122.1 |
| 8,240,628 B2 * | 8/2012 | Huang | F16M 11/041 248/122.1 |
| 8,376,301 B2 * | 2/2013 | Fan | F16M 11/041 248/231.21 |
| 8,490,937 B2 * | 7/2013 | Crain | G01C 15/00 224/929 |
| 8,496,144 B2 * | 7/2013 | Son | B60R 11/02 224/276 |
| 8,749,200 B2 * | 6/2014 | Huang | H02J 7/0042 248/346.04 |
| 8,777,059 B2 | 7/2014 | Middleton | |
| 8,800,942 B2 * | 8/2014 | Yu | F16M 11/14 248/122.1 |
| 8,864,089 B2 * | 10/2014 | Hung | F16M 11/041 248/122.1 |
| 8,885,337 B2 | 11/2014 | Schanz et al. | |
| 8,998,048 B1 * | 4/2015 | Wu | B62J 11/00 224/420 |
| 9,097,380 B2 * | 8/2015 | Wheeler | A47F 7/024 |
| 9,297,495 B2 * | 3/2016 | Fischer | F16M 11/041 |
| 9,408,456 B2 * | 8/2016 | Hart | A45F 5/021 |
| 9,573,531 B2 * | 2/2017 | Zhang | B60R 11/02 |
| 9,707,901 B2 * | 7/2017 | Lee | B60R 11/02 |
| 9,797,543 B2 * | 10/2017 | Lin | E05B 73/0082 |
| 9,889,800 B1 * | 2/2018 | Fan | B60R 11/0241 |
| 9,931,995 B2 * | 4/2018 | Lee | B60R 11/02 |
| 9,933,109 B2 * | 4/2018 | Moore | F16M 13/02 |
| 9,936,823 B2 * | 4/2018 | Galant | F16M 11/041 |
| 2002/0046981 A1 | 4/2002 | Amish | |
| 2007/0034753 A1 * | 2/2007 | Lee | B60R 11/0241 248/121 |
| 2008/0070641 A1 * | 3/2008 | Wang | H04M 1/04 455/569.1 |
| 2008/0203260 A1 | 8/2008 | Carnevali | |
| 2010/0011798 A1 | 1/2010 | Robertson | |
| 2012/0074272 A1 * | 3/2012 | Hull | F16M 11/041 248/122.1 |
| 2012/0175474 A1 * | 7/2012 | Barnard | F16M 11/041 248/122.1 |
| 2012/0317776 A1 | 12/2012 | Carnevali | |
| 2013/0043369 A1 * | 2/2013 | Wheeler | A47F 7/024 248/551 |
| 2013/0153721 A1 * | 6/2013 | Yu | F16M 11/14 248/205.6 |
| 2014/0097306 A1 | 4/2014 | Hale et al. | |
| 2015/0300050 A1 * | 10/2015 | Van Balen | A47F 7/0246 248/551 |

OTHER PUBLICATIONS

Compilation of images of mounts, compiled on Aug. 21, 2015.
"Comsun bike mount", accessed on-line https://www.desertcart.ae/products/15547539-bike-phone-mount-bicycle-holder-comsun-universal-adjustable-bicycle-cell-phone-holder-cradle-stand-for-motorcycle-rack-handlebar-smartphone-gps-navigation-360-degree-rotation, 2018, 4 pages.
"GVDV universal bike mount" accessed on-line https://www.amazon.com/Universal-Anti-Slip-Adjustable-Bicycle-Motorcycle/dp/B06XQX7QSX/ref=sr_1_1?ie=UTF8&qid=1525063368&sr=8-1&keywords=gvdv, 2018, 8 pages.
"Liger Dual Grip" accessed on-line https://www.itechdeals.com/liger-dual-grip-universal-bike-mount-handlebar-holder-in-black.html, 2018, 2 pages.
"Bike Strap" accessed on-line https://dotely.en.made-in-china.com/product/UjgxXHFTbLkl/China-Cycling-Bike-Silicone-Elastic-Rubber-Strap-Bandage-Holder.html, 2018, 9 pages.
"Liger SuperGrip bike mount" accessed on-line https://www.amazon.com/Liger-Universal-SuperGrip-Handlebar-Smartphones/dp/B00YAYPR2I, 2018, 8 pages.
"Aduro UGrip Plus" accessed on-line https://www.aduroproducts.com/collections/types?q=iPhone, 2018, 3 pages.
"Handleband" accessed on-line http://www.niteize.com/product/HandleBand.asp, 2018, 5 pages.
"ArmorX bike mount" accessed on-line https://www.armor-x.com/case/apple-iphone-ipad-ip68-waterproof-shockproof-cases-cover/iphone/iphone-6-6s-waterproof-shockproof-rugged-case-skin-cover.html#SHOP, 2018, 8 pages.
"RAM U-Mount handlebar" accessed on-line https://www.rammount.com/activity/motorcycle-bases#ubolt-base, 2018, 13 pages.
"RAM finger cradle" accessed on-line https://www.rammount.com/part/RAM-HOL-UN4U, 2018, 5 pages.
"RAM spring cradle mount" accessed on-line https://www.rammount.com/part/RAM-HOL-TAB18U, 2018, 6 pages.
"Motorcycle mount AliExpress" accessed on-line https://www.aliexpress.com/item/360-Degree-Rotation-Motorcycle-Phone-Holder-Shock-Resistant-Motorbike-Scooter-Stand-Mount-Bracket-for-Mobile-Phone/32507163547.html, 2018, 8 pages.
"RAM spring holder" accessed on-line https://www.rammount.com/part/RAM-HOL-UN4U, 2018, 7 pages.
"RAM X-Grip" accessed on-line https://www.rammount.com/part/RAM-HOL-UN7BU, 2018, 7 pages.
"iOttie Active Edge" accessed on-line https://www.iottie.com/Product/Detail/1147/iOttie-Active-Edge-Bike-Mount-for-Phone-_-Smartphones-_-Electric-Lime, 2018, 9 pages.

(56) References Cited

OTHER PUBLICATIONS

"CelGo Spring clamp" accessed on-line https://www.kickstarter.com/projects/celgo/celgo-flexible-hands-free-cell-phone-holder-for-yo, 2018, 27 pages.
"MobMount Switch holder" accessed on-line http://mobarmor.com/products/smart-phone/mob-mount-switch/, 2018, 3 pages.
"John Deere RAM tablet mount" accessed on-line https://www.greenfarmparts.com/John-Deere-RAM-Tablet-Mount-Kit-BRE10255-p/bre10255.htm, 2018, 5 pages.
"RAM boat mount" accessed on-line https://www.rammount.com/part/RAM-B-224-1U, 2018, 5 pages.
"John Deere RAM mount" accessed on-line https://www.greenpartstore.com/John-Deere-RAM-Premium-Tablet-Mount-BXE10479.html, 2018, 5 pages.
"Touratech TomTom brace" accessed on-line https://touratech-usa.com/Store/Touratech-Locking-Mount-for-TomTom-Rider, 2018, 5 pages.
"Touratech iBracker" accessed on-line https://shop.touratech.com/handlebar-bracket-ibracket-for-apple-iphone-6-7-8-motorcycle-bicycle.html, 2018, 5 pages.
"Garmin Lock Mount" accessed on-line https://touratech-usa.com/Store/Locking-GPS-Mount-Black-Garmin-Montana-Monterra-Motorrad-Adventure https://touratech-usa.com/Store/Locking-GPS-Mount-Silver-Garmin-Montana-Monterra-Motorrad-Adventure, 2018, 6 pages.
"Vivitar handlebar mount" accessed on-line https://www.amazon.com/Vivitar-Handlebar-Mount-Action-Cameras/dp/B00LV8HTK4/ref=sr_1_sc_1?ie=UTF8&qid=1525065421&sr=8-1-spell&keywords=vivitar+handle+bar+mount, 2018, 5 pages.
"Cygolite handlebar bracket" accessed on-line https://shop.cygolite.com/product.sc;sessionid=E232098A86C4A87697E5D4FB7CF13294.p3plqscsfapp001?productId=103&categoryId=31, 2018, 1 page.
"RAM twist-lock suction base" accessed on-line https://www.rammount.com/part/RAM-B-166U, 2018, 6 pages.
"Aluminum GoPro Mount" accessed on-line http://www.dx.com/p/high-precision-cnc-aluminum-alloy-bike-handlebar-rnount-for-gopro-hero3-3-2-hd-silver-black-285540#.WuaneS-ZNX8, 2018, 4 pages.
"RAM U-bolt" accessed on-line https://www.rammount.com/part/RAM-235U, 2018, 5 pages.
"RAM small tough claw" accessed on-line https://www.rammount.com/part/RAP-B-400U, 2018, 5 pages.
"Thurman leather phone mount" accessed on-line http://www.thebeebecompany.com/thurman-leather-bike-phone-holder/, 2018, 4 pages.
"Ballymore spring platform" accessed on-line http://www.ballymore.com/products/stainless-steel-rolling-ladders/stainless-steel-spring-loaded-caster-ladders, 2018, 2 pages.
"Dalcross spring loaded lift platform" accessed on-line http://www.dalcross.com.au/shop/stainless-steel-trolleys-carts-products/linen-skips/spring-loaded-lift-platform/, 2018, 1 page.
"Motor intertia base" accessed on-line https://www.thevmcgroup.com/Catalog/SubCategoryProduct?subCatProdId=104&pscid=0, 2018, 3 pages.
"Spring loaded adjustment bracket" accessed on-line https://www.thefabricator.com/article/testingmeasuring/electronic-sensors-augment-error-proofing-quality-control-programs, 2018, 6 pages.

\* cited by examiner

MOUNTING ASSEMBLY

CROSS REFERENCE TO RELATED APPLICATIONS

This application claims priority to U.S. Patent Application No. 62/316,185, which is entitled "MOUNTING ASSEMBLY," and was filed on Mar. 31, 2016, the content of which is incorporated herein by reference in its entirety.

BACKGROUND

There are various mounting devices available for mounting hand held electronic computing devices, such as a mobile phone, to a handlebar of a motorcycle or bicycle or to a surface of a vehicle. However, these available mounting devices are unreliable in their ability to hold the computing device during operating conditions, may be incompatible with differently sized computing devices, and can be cumbersome to use. Thus, a need exists for a mounting device that is reliable, compatible with various sized computing devices, and/or is easy to use.

BRIEF SUMMARY

Various implementations include a mounting assembly that includes a clamp plate having a first surface and a second surface, at least two engagement arms, and a base plate. The first and second surfaces of the clamp plate are opposite and spaced apart from each other. Each engagement arm has a proximal end and a distal end, wherein the proximal ends are coupled to the clamp plate and are spaced apart from and opposite each other. The distal ends of the engagement arms are spaced apart from the first surface of the clamp plate and extend toward each other, and each engagement arm has a distal portion adjacent its respective distal end. The base plate is disposed between the distal portions of the engagement arms and the first surface of the clamp plate. The base plate has a first surface that faces the distal portions of the engagement arms and a second surface that faces the first surface of the clamp plate. One of the first surface of the base plate or the distal portions of the engagement arms are biased toward the other of the distal portions or the first surface of the base plate via a spring force, and an object is securable between the first surface of the base plate and the distal portions of the engagement arms. In some implementations, the engagement arms include a first engagement arm and a second engagement arm. The proximal end of the first engagement arm is coupled to a first portion of the clamp plate, and the proximal end of the second engagement arm is coupled to a second portion of the clamp plate. The first and second portions of the engagement arms are coupled along adjacent edges of each portion.

For example, in some implementations, the object to be secured between the first surface of the base plate and the distal portions of the engagement arms includes a handheld electronic computing device.

In certain implementations, the clamp plate comprises spring steel and is biased into an engagement position about the adjacent edges. In the engagement position, a first plane that includes the first portion of the clamp plate is disposed at a first angle greater than 0° from a second plane that includes the second portion of the clamp plate. The clamp plate is urgable into a non-engagement position in which the first plane is disposed at a second angle relative to the second plane, and the first angle is greater than the second angle.

In some implementations, the mounting assembly may also include a cam that is movable between a first position to allow the clamp plate to be in the engagement position and a second position in which the clamp plate is urged into the non-engagement position. The clamp plate and base plate are coupled to a mounting body, and the cam is rotatably coupled to the mounting body adjacent the second surface of the clamp plate.

In some implementations, at least one frictional material is disposed on at least a portion of the first surface of the base plate, the frictional material having a static coefficient of friction relative to the object that is greater than a static coefficient of friction of the first surface of the base plate relative to the object. For example, the frictional material may include a silicone pad, a foamed pad, rubber pad, elastomeric pad, and/or a frictional coating.

In another implementation, at least one spring is disposed between the first surface of the clamp plate and the second surface of the base plate, and the spring is for biasing the first surface of the base plate toward the distal portions of the engagement arms. For example, the spring may include a helical spring, a leaf spring, or a spring steel plate.

In an implementation having a spring steel plate, the spring steel plate includes at least one bend axis and first and second side edges. The first and second side edges are spaced apart from and opposite each other relative to the bend axis, and the spring plate is bent and biased about the bend axis such that the first and second side edges of the spring plate extend toward the first surfaces of the first and second portions of the clamp plate. In addition, the clamp plate includes a first portion and a second portion that are hingedly coupled along adjacent edges of each portion. The first and second portions of the clamp plate are movable between a nonengagement position and an engagement position. The engagement position includes the first surfaces of the first and second portions lying at a first angle greater than 0° to each other, and the nonengagement position includes the first surfaces of the first and second portions lying at a second angle relative to each other, wherein the first angle is greater than the second angle. In the engagement position, the spring plate urges the first surfaces of the first and second portions of the clamp plate away from the second surface of the base plate and the distal portions of the engagement arms toward the first surface of the base plate.

This implementation may further include a cam disposed adjacent the second surfaces of the first and second portions of the clamp plate, wherein the cam is actuatable in a first direction to urge the first and second portions into the nonengagement position and is actuatable in a second direction to allow the spring plate to urge the first and second portions into the engagement position.

In some implementations, the base plate includes a first edge and a second edge that are spaced apart from and opposite each other. Each edge may include a lip that extends away from the first surface of the base plate in a direction toward the distal ends of the engagement arms and away from the clamp plate. In some implementations, the axes that extend along each edge of the base plate are substantially parallel to each other and are perpendicular to axes that extend along proximal ends of the engagement arms.

Furthermore, in some implementations, the base plate includes a first portion that has the first edge of the base plate and a second portion that has the second edge of the base plate. The first and second portions of the base plates have edges disposed adjacent to each other and are opposite and spaced apart from the first and second edges of the base plate, respectively. The distance between the adjacent edges of the first and second portions of the base plate is adjustable.

In various implementations, the assembly further includes a swivel assembly that includes a ball and a socket that are rotatably coupled together. One of the ball or socket are coupled to the clamp plate, and the other of the socket or ball are coupled to a mounting base. In some implementations, the mounting base couples the mounting assembly to a surface on or within a vehicle.

For example, in some implementations, the mounting base defines an opening sized to receive a handlebar. In one implementation, the mounting base includes a first clamp and a second clamp. The first clamp has a base and two arms that extend from the base of the first clamp. The two arms define the opening, and distal ends of the two arms are movable away from each to receive the handlebar and are biased toward each other to grip the handlebar. The second clamp is coupled around the arms of the first clamp to prevent the arms from moving away from each other.

In other implementations, the mounting base includes at least one magnet for magnetically coupling the mounting base to a surface on or within a vehicle. In other implementations, the mounting base includes an adhesive for adhesively coupling the mounting base to a surface on or within a vehicle. In another implementation, the mounting base defines one or more openings for receiving a screw to secure the mounting base to a surface on or within a vehicle.

In some implementations, the at least one spring is disposed between the second surface of the base plate and a surface of the mounting assembly that is fixed relative to the clamp plate. The spring biases the first surface of the base plate toward the distal ends of the engagement arms. For example, in some implementations, the surface of the mounting assembly that is fixed relative to the clamp plate includes a floor of a recess defined in a first side of a mounting body. In addition, the mounting body includes a ball joint extending from a second side of the mounting body, and the ball joint and recess are spaced apart. The recess may be an annular shaped recess, and a plug extends from the second surface of the base plate. The plug defines a central opening and an annular recess spaced radially outwardly from the central opening, and the spring is disposed between a floor of the annular recess of the plug and the floor of the annular shaped recess of the mounting body. In some implementations, an inner surface of a distal end of the plug has a diameter that is less than a diameter of the inner surface of a proximal end of the plug. The distal end of the plug defines the annular recess of the plug, and a fastener that has a head is coupled through the opening defined by the mounting body. The head has an outer diameter that is greater than the inner diameter of the distal end of the plug.

In some implementations, the spring is disposed between the plug and the floor of the recess. In addition, in some implementations, the mounting assembly further includes a mounting base that defines a semi-spherical opening for receiving the ball joint therein. And, in some implementations, the mounting body includes a flange that extends radially outwardly from the mounting body adjacent the first side of the mounting body. The mounting body extends through an opening defined in a central portion of the clamp plate, and the flange is disposed adjacent the first surface of the clamp plate.

BRIEF DESCRIPTION OF THE DRAWINGS

Various implementations are explained in even greater detail in the following exemplary drawings. The drawings are merely exemplary to illustrate the structure of various devices and certain features that may be used singularly or in combination with other features. The invention should not be limited to the implementations shown.

DETAILED DESCRIPTION

Figure 1:
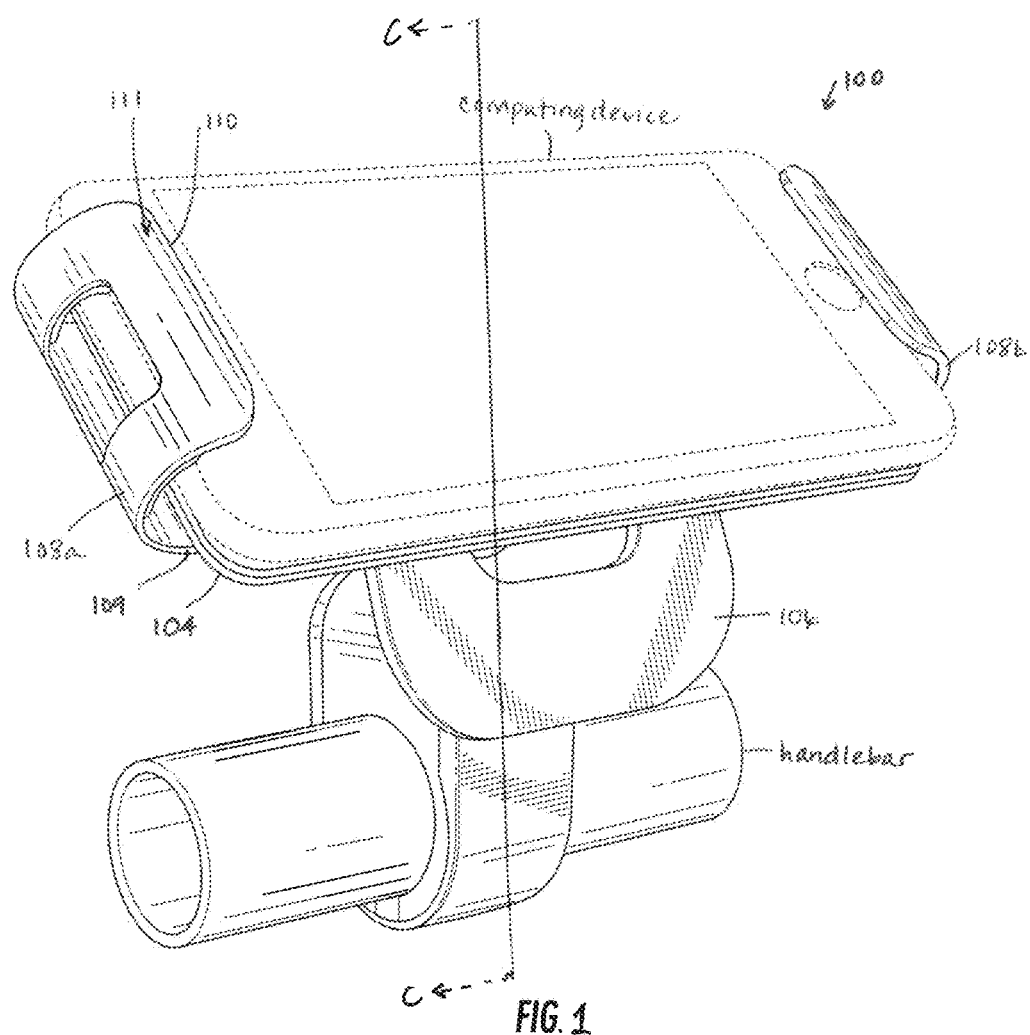
FIG. 1 illustrates a front perspective view of a mounting assembly in an engagement position, according to one implementation.
Figure 2:
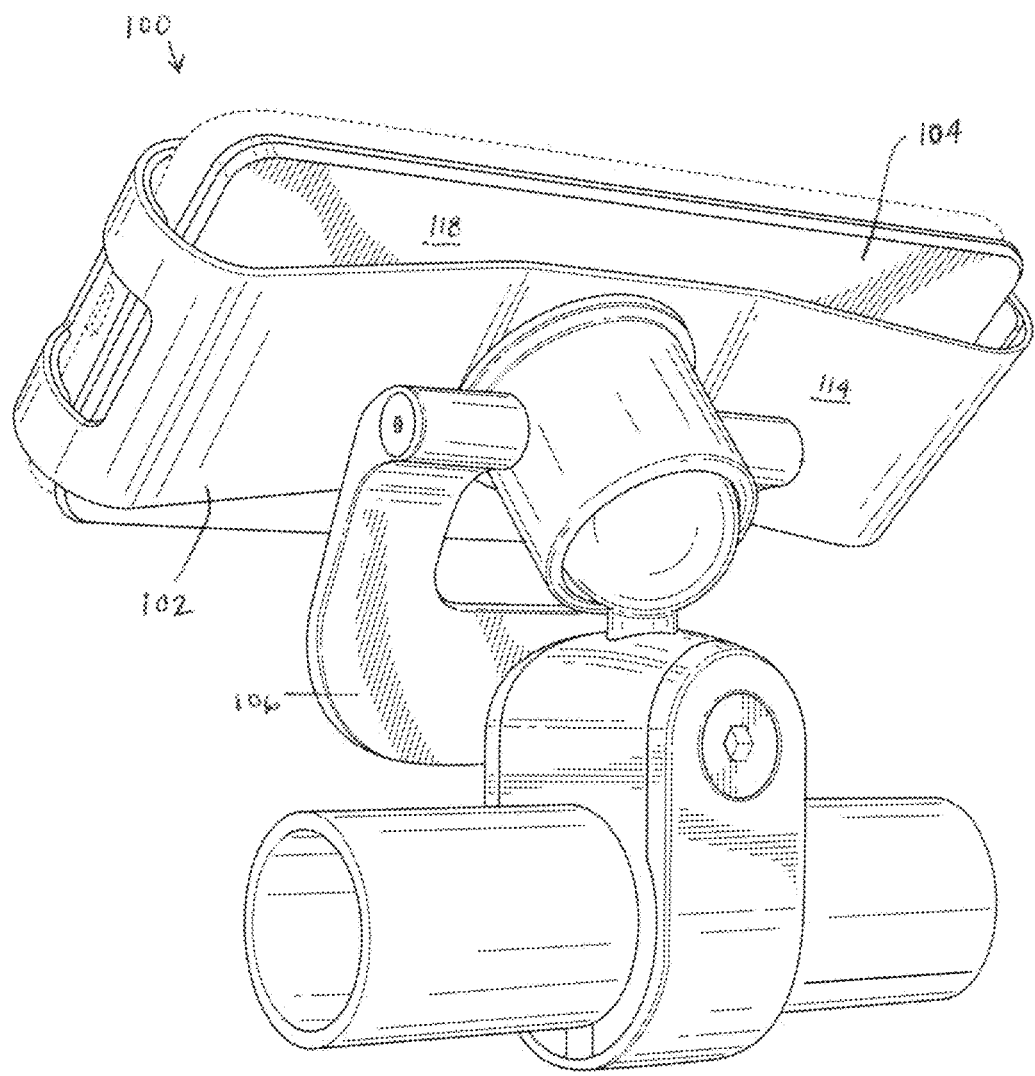
FIG. 2 illustrates a rear perspective view of the mounting assembly in FIG. 1.

Various implementations include a mounting assembly that uses a spring force to urge a surface of a base plate and distal portions of engagement arms toward each other to secure an object, such as a handheld electronic computing device, between the surface and the distal portions. In particular, various implementations of the mounting assembly include a clamp plate and a base plate. Each plate has a first surface and a second surface. At least two engagement arms extend from the clamp plate, and each engagement arm has a proximal end coupled to the clamp plate and a distal end spaced apart from the proximal end and the first surface of the clamp plate. The distal ends of the engagement arms are spaced apart from each other and extend toward each other. Each engagement arm has a distal portion adjacent the distal end. The base plate is disposed between distal portions of the engagement arms and the first surface of the clamp plate such that the second surface of the base plate faces the first surface of the clamp plate. One of the first surface of the base plate or the distal ends of the engagement arms are biased toward the other of the distal ends or the first surface of the base plate via a spring force to secure the object to be held therebetween.

FIGS. 1 through 5 illustrate one implementation of the mounting assembly. In particular, mounting assembly 100 includes a clamp plate 102 and a base plate 104. The clamp plate 102 includes a first surface 112 and a second surface 114, and the base plate 104 includes a first surface 116 and a second surface 118. The clamp plate 102 also includes engagement arms 108a, 108b. The engagement arms 108a, 108b each include a proximal end 109 coupled to the clamp plate 102 and a distal end 110 that is spaced apart from the proximal end 109. Each engagement arm 108a, 108b has a distal portion 111 adjacent each distal end 110. The proximal ends 109 are spaced apart and opposite each other, and the distal ends 110 are spaced apart from the first surface 112 of the clamp plate 102 and extend toward each other. The base plate 104 is disposed between the first surface 112 of the clamp plate 102 and the distal portions 111 of the engagement arms 108a, 108b. The first surface 116 of the base plate 104 faces the distal portions 111 of the engagement arms 108a, 108b, and the second surface 118 of the base plate 104 faces the first surface 112 of the clamp plate 102.

In addition, in some implementations, at least one frictional material 152 is disposed on at least a portion of the first surface 116 of the base plate 104 to prevent the object being held by the mounting assembly 100 from slipping relative to the first surface 116 of the base plate 104. Exemplary frictional materials may include a silicone pad, a foamed (foam polymer) pad, a rubber pad, a frictional coating (e.g., silicone or elastomeric coating that has a static coefficient of friction that is greater than a static coefficient of friction of the first surface 116), or combination thereof. The frictional material 152 prevents the object held between the base plate 104 and the engagement arms 108a, 108b from slipping relative to the base plate 104 while being placed within the mounting assembly and while being held within the mounting assembly.

Figure 12:
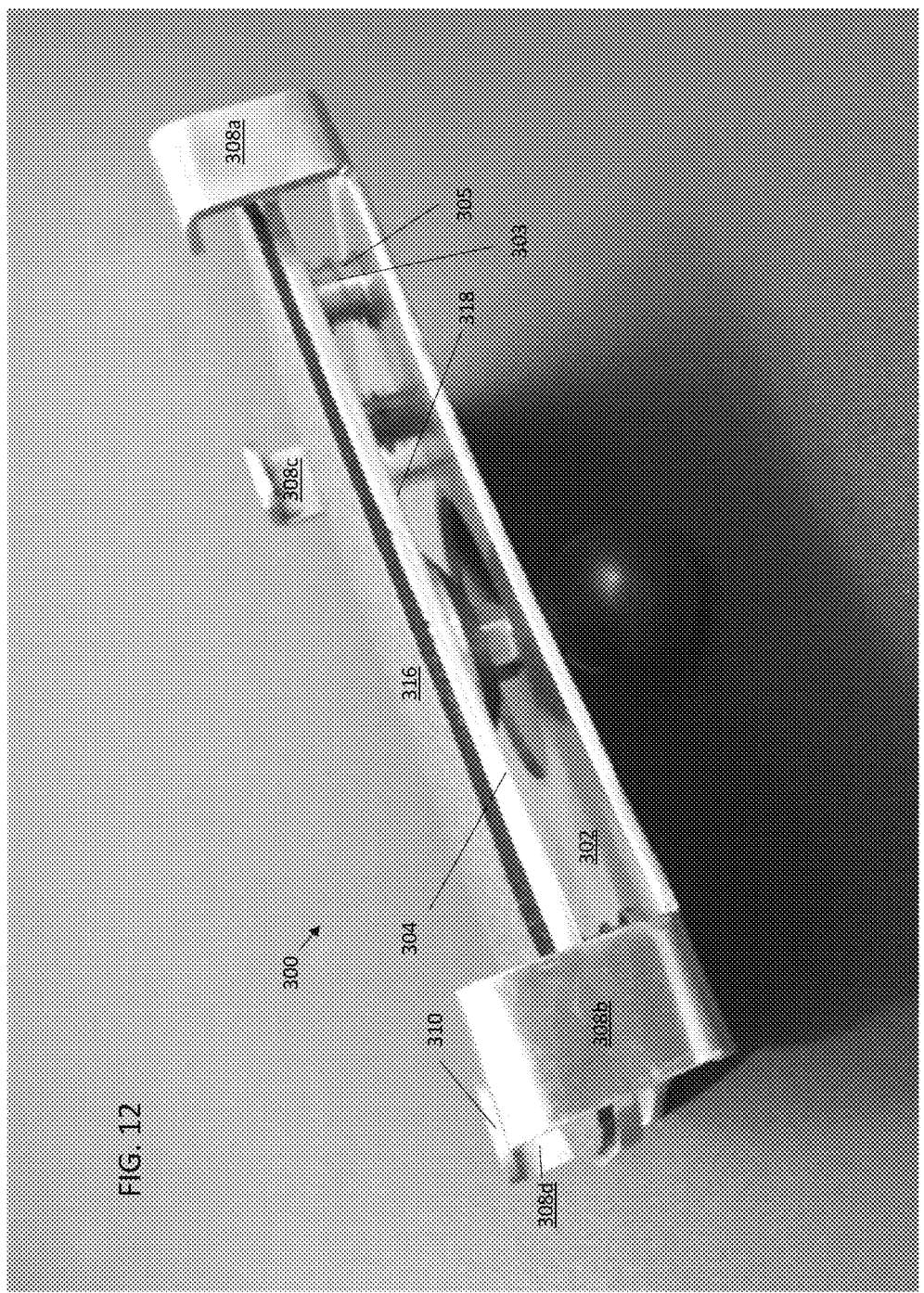
FIG. 12 illustrates a side perspective view of a mounting assembly according to another implementation.
Figure 13:
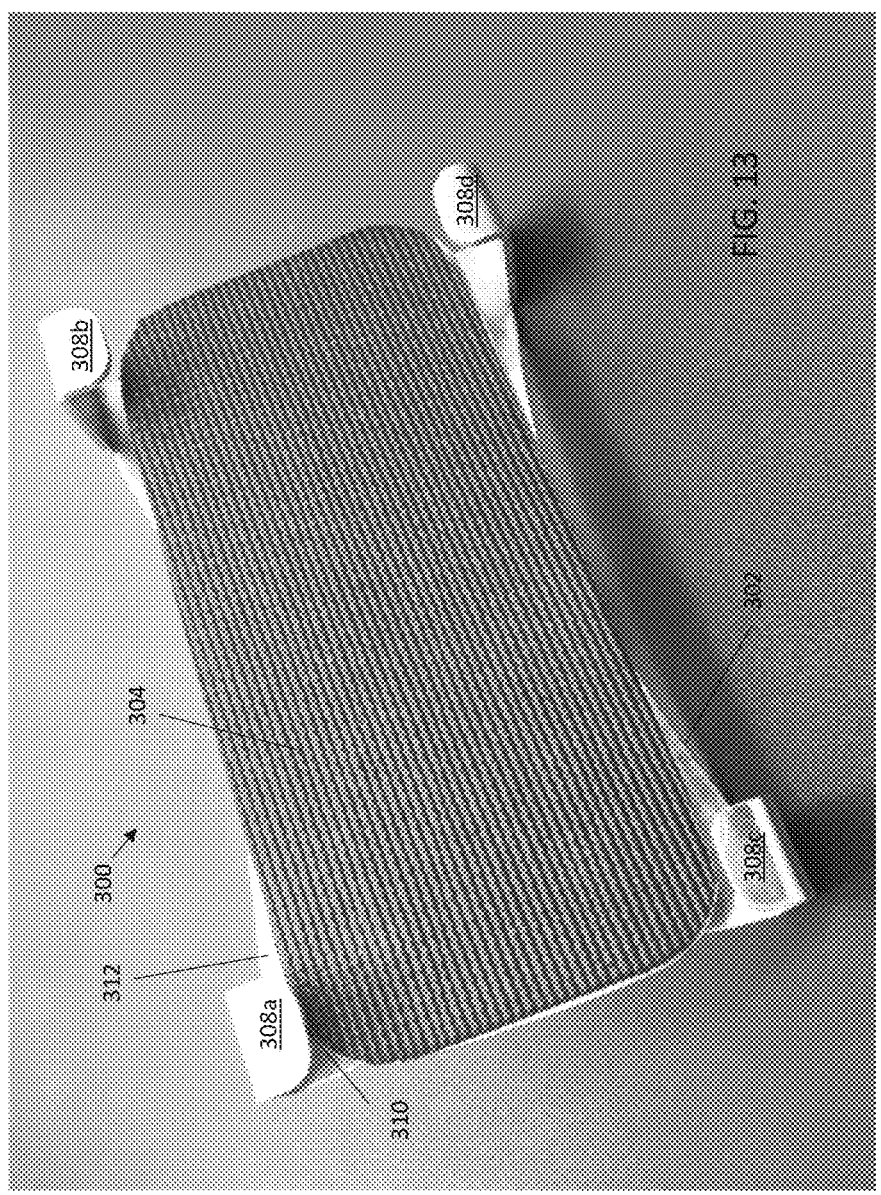
FIG. 13 illustrates a front perspective view of the mounting assembly in FIG. 12.
Figure 14:
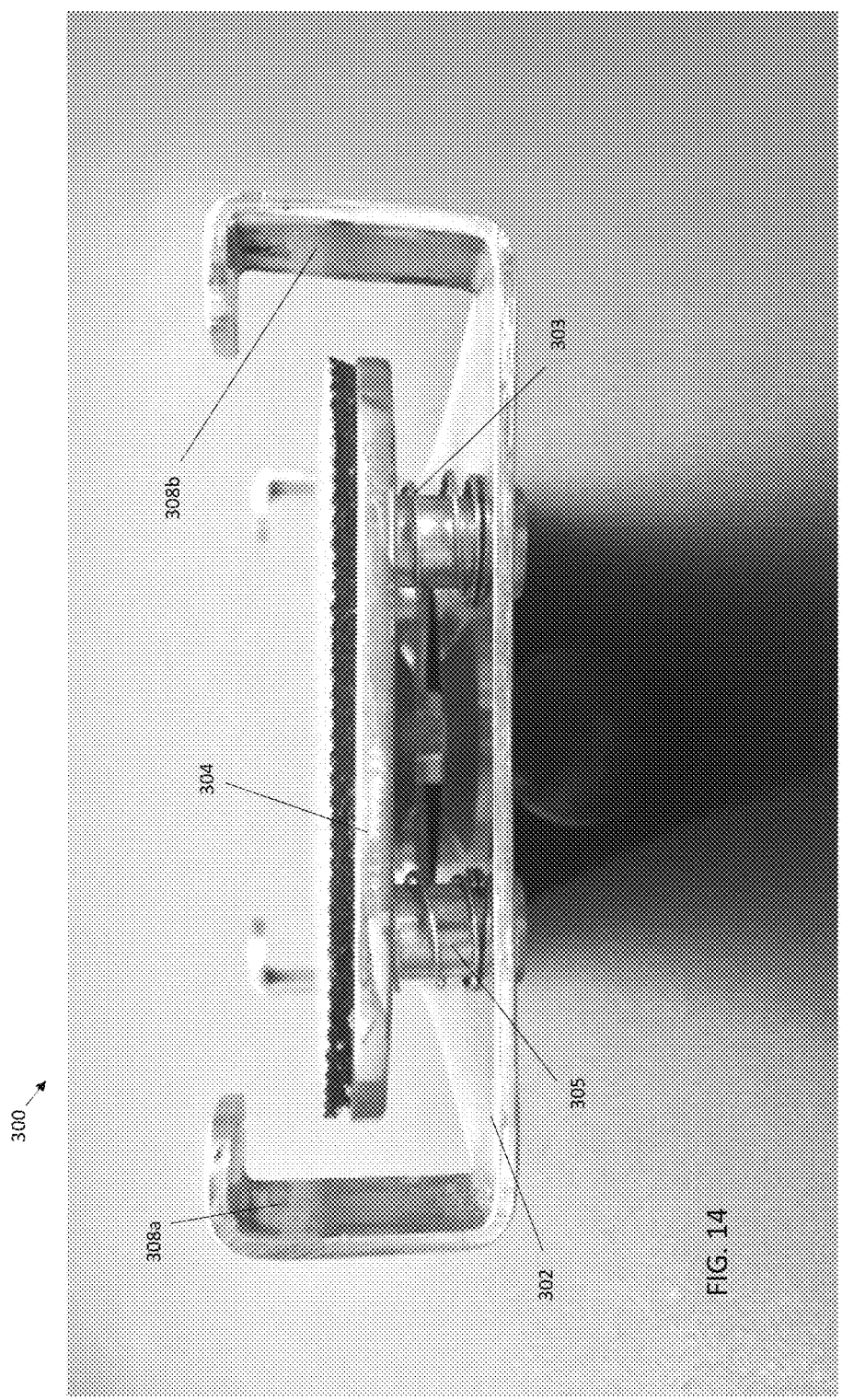
FIG. 14 illustrates a side perspective view of the mounting assembly in FIG. 12.
Figure 15:
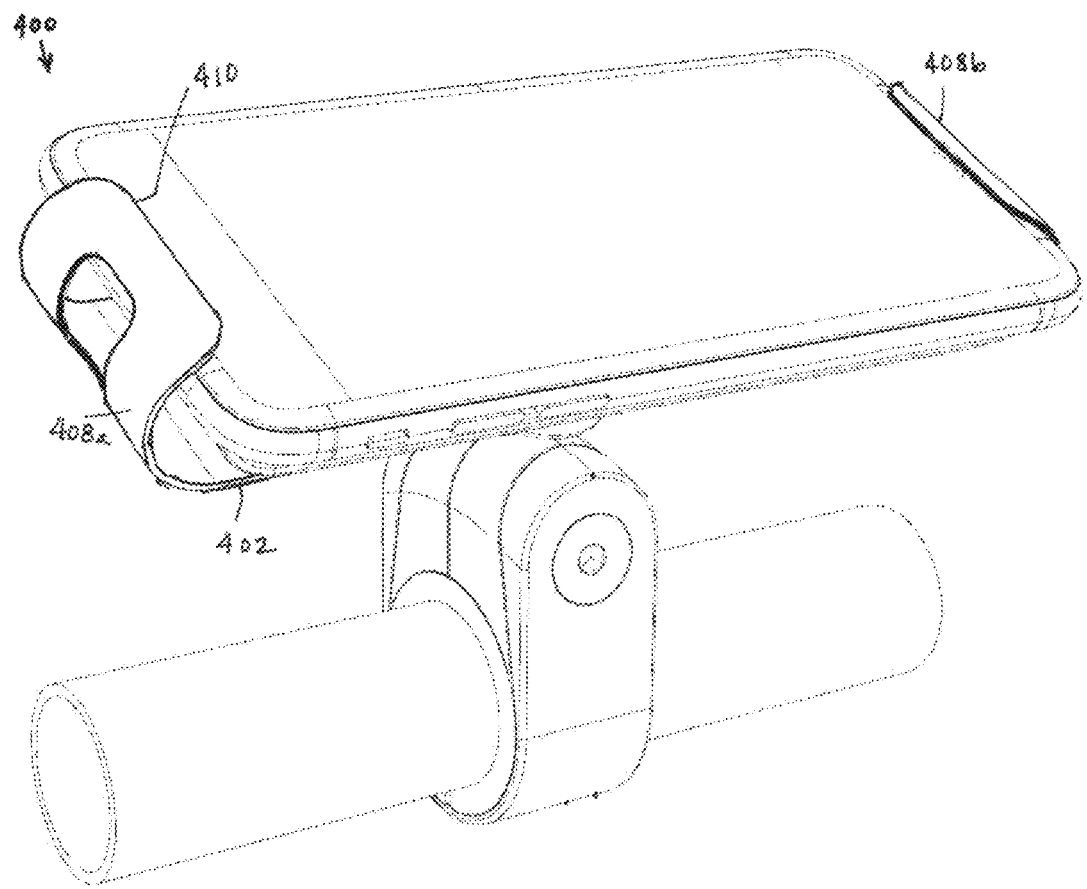
FIG. 15 illustrates a front perspective view of a mounting assembly according to another implementation and a computing device being held within the mounting assembly.
Figure 16:
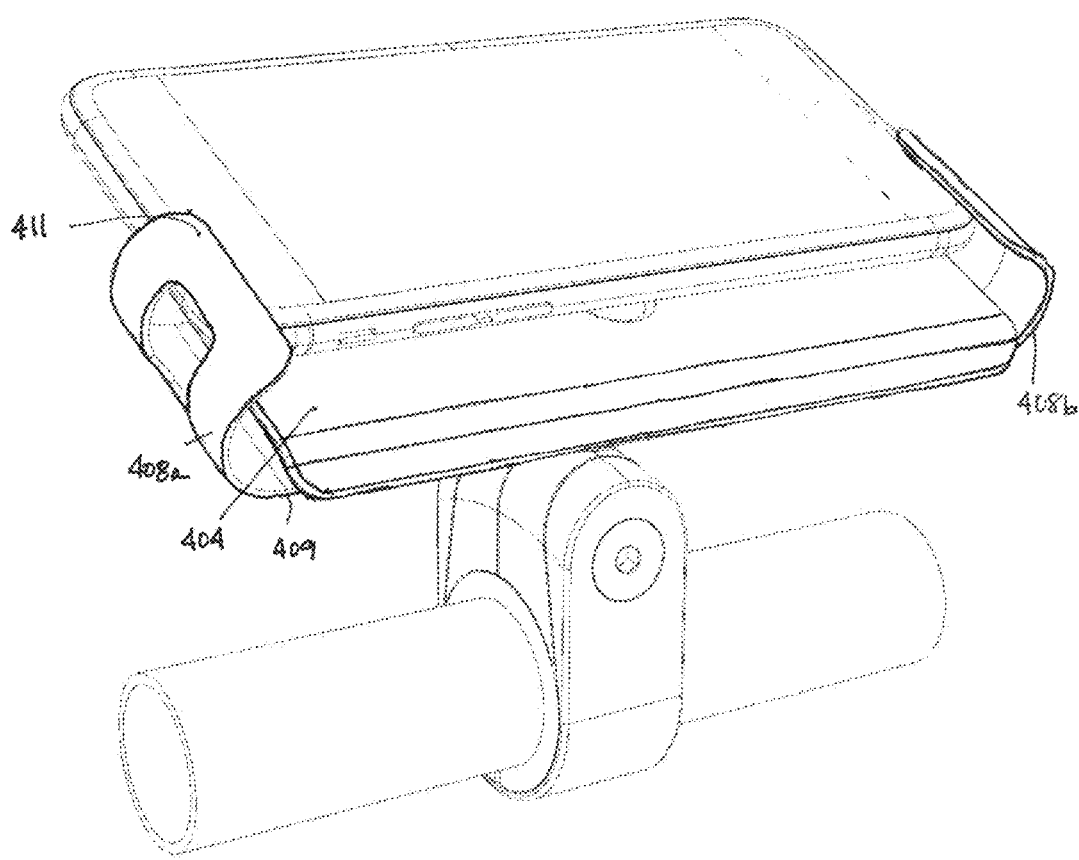
FIG. 16 illustrates a front perspective view of the mounting assembly in FIG. 15 with the computing device being partially within the assembly.
Figure 17:
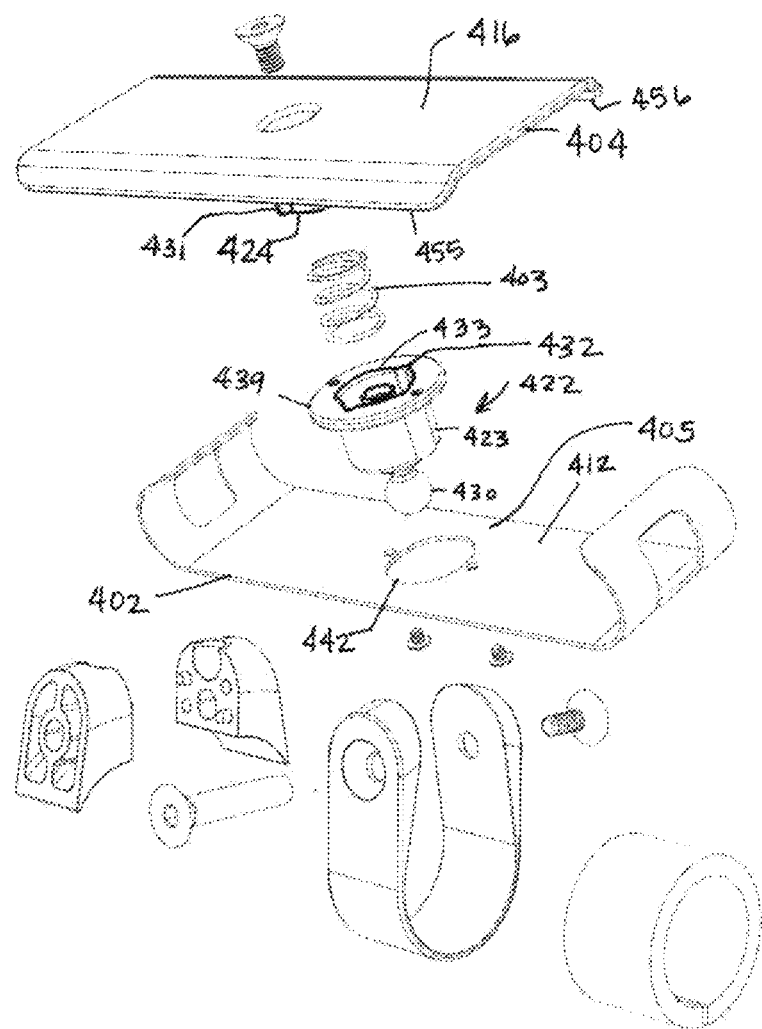
FIG. 17 illustrates an exploded view of the mounting assembly shown in FIG. 15.
Figure 18:
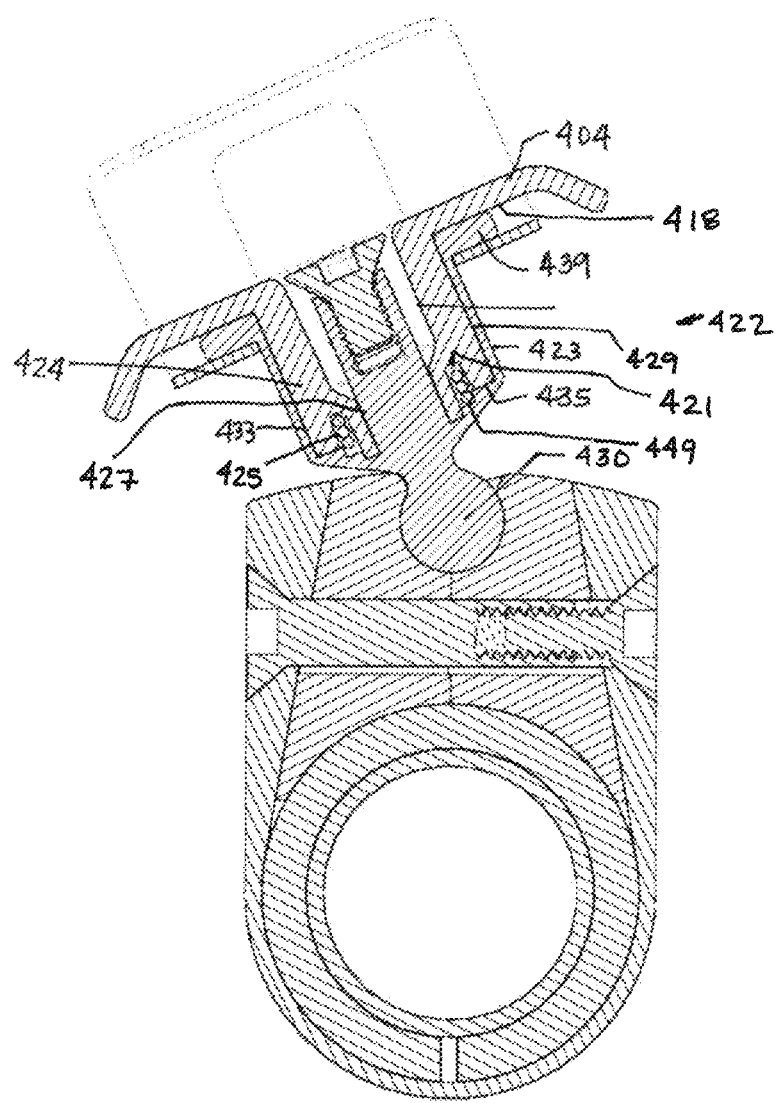
FIG. 18 illustrates a cross sectional view of the mounting assembly shown in FIG. 15.

Engagement arm 108a is coupled to a first portion 102a of the clamp plate 102, and engagement arm 108b is coupled to a second portion 102b of the clamp plate 102. The first portion 102a and the second portion 102b are coupled together along a common edge through which axis A-A extends. In addition, each engagement arm 108a, 108b has a curved, or arcuate shaped, shape profile between the proximal end 109 and the distal end 110. However, in other implementations (such as shown in FIGS. 12-14), the engagement arms 108a, 108b may include an L-shaped, straight, or other alternatively shaped profile. In addition, in the implementation shown in FIGS. 1-5, the engagement arms 108a, 108b are integrally formed with the clamp plate 102. However, in other implementations, the engagement arms may be formed separately and coupled to the clamp plate 102. In addition, the first 102a and second portions 102b of the clamp plate 102 are integrally formed. However, in other implementations, the first 102a and second portions 102b of the clamp plate may be separately formed and coupled together with a fastener.

Figure 3:
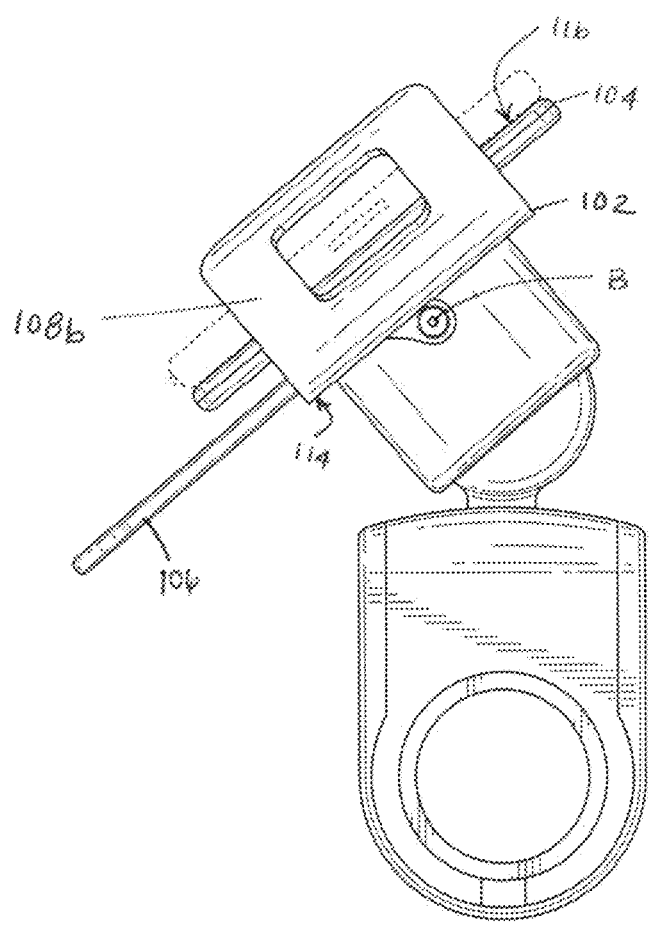
FIG. 3 illustrates a side view of the mounting assembly in FIG. 1 in the non-engagement position.
Figure 4:
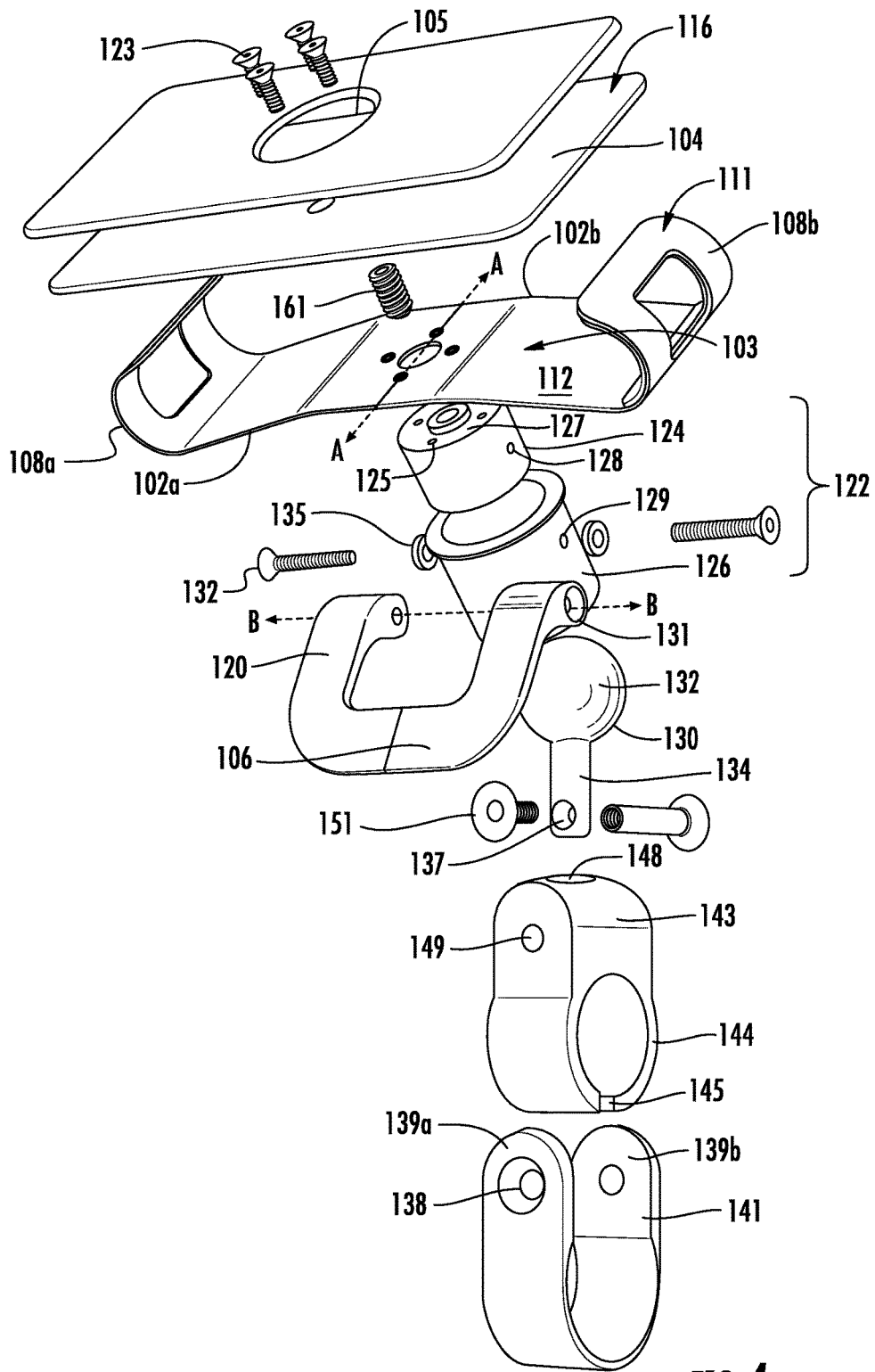
FIG. 4 illustrates an exploded view of the mounting assembly of FIG. 1.

The clamp plate 102 is made of spring steel (e.g., 300 series spring steel) and is biased into an engagement position about adjacent edges of the first 102a and second portions 102b. In the engagement position, a plane that includes the first portion 102a of the clamp plate 102 is disposed at a first angle from a plane that includes the second portion 102b of the clamp plate 102, wherein the first angle is greater than 0°. In the non-engagement position, the planes are disposed at a second angle, which is less than the first angle. FIG. 1 shows the clamp plate 102 in the engagement position, and FIG. 3 shows the clamp plate 102 in a non-engagement position. Because the clamp plate 102 is biased into the engagement position, the force to overcome the spring force of the clamp plate 102 is required to insert and remove the electronic computing device from between the base plate 104 and the distal portions 111 of the engagement arms 108a, 108b.

A force greater than the biasing force of the spring steel may be applied to the second surface 114 of the clamp plate 102 to urge each portion 102a, 102b of the clamp plate 102 into the non-engagement position. This force may be applied by a cam lever 106. The cam lever 106 includes a cam surface 120 and an axis of rotation B-B. The cam lever 106 is rotatable about the axis B-B between a first position, as shown in FIG. 1, and a second position, as shown in FIG. 3. In the first position, the cam surface 120 does not contact the second surface 114 of the clamp plate 102, allowing the clamp plate 102 to move into its biased, engagement position. In the second position, the cam surface 120 contacts the second surface 114 of the clamp plate 102 and urges the portions 102a, 102b of the clamp plate 102 into the non-engagement position. In some implementations, the vertical travel of the distal ends 110 of the engagement arms 108a, 108b due to the engagement or disengagement of the clamp plate 102 is about ⅝ inches. In addition, in some implementations, the thickness of the spring steel selected for the clamp plate 102 is at least 0.02". For example, in certain implementations, the thickness is 0.035".

The mounting assembly 100 further includes a mounting body 122. The mounting body 122 includes a plug 124 and a socket 126. The plug 124 is cylindrically shaped, and the socket 126 defines a cylindrically shaped opening. The plug 124 is disposed within the opening of the socket 126. However, in other implementations, the plug and opening defined by the socket may have another three-dimensional shape, such as a rectangular prism, triangular prism, trapezoidal prism, or other suitable shape.

The plug 124 defines a plurality of openings 125 on its first surface 127. The openings 125 are arranged to receive fasteners 123 for coupling the base plate 104 and the clamp plate 102 to the plug 124. To couple the base plate 104 and the clamp plate 102 to the plug 124, openings defined through the central portion 105 of the base plate 104 and central portion 103 of the clamp plate 102 are aligned together and with the corresponding openings in the plug 124, and fasteners 123, such as screws or pins, are engaged through the openings. The fasteners 123 fixedly couple the central portion 105 of the base plate 104 and the central portion 103 of the clamp plate 102 together, such that the central portions 105, 103 remain coupled when the clamp plate portions 102a, 102b move between the engagement and non-engagement positions.

The plug 124 defines an opening 128 that extends through its side wall. The socket 126 also defines openings 129 in its side wall, and openings 129 align with opening 128 when the plug 124 is disposed within the socket 126. Openings 131 defined through each end of the cam lever 106 also align with these openings 128, 129, and one or more fasteners 132 are engaged through the openings 131, 129, 128 to couple the plug 124, the socket 126, and the cam lever 106 together while allowing the cam lever 106 to rotate about the axis B-B, which extends through the openings 131, 129, 128. The fasteners 132 may include a screws or rod, for example. However, any suitable fastener may be used to couple the plug 124, socket 126, and the cam lever 106. In addition, a washer 135 (e.g., Viton® fluoroelastomer sealing washer) may be disposed around the fastener 132 and between the inner surface of the cam lever 106 and the outer surface of the socket 126 side wall.

The socket 126 may be part of a swivel assembly that also includes a ball joint 130 for engaging a portion of the socket 126 adjacent the plug 124. The ball joint 130 includes a ball portion 132 and a stem 134. The ball portion 132 is rotatably held within the socket 126, and the stem 134 extends out of the socket 126. This arrangement allows the socket 126 and plug 124 to rotate about the ball portion 132, relative to the stem 134. The ball joint 130 and the socket 126 may be formed of aluminum, stainless steel, or other suitably rigid materials, and the materials selected for the ball joint 130 and socket 126 may be the same or different.

Figure 5:
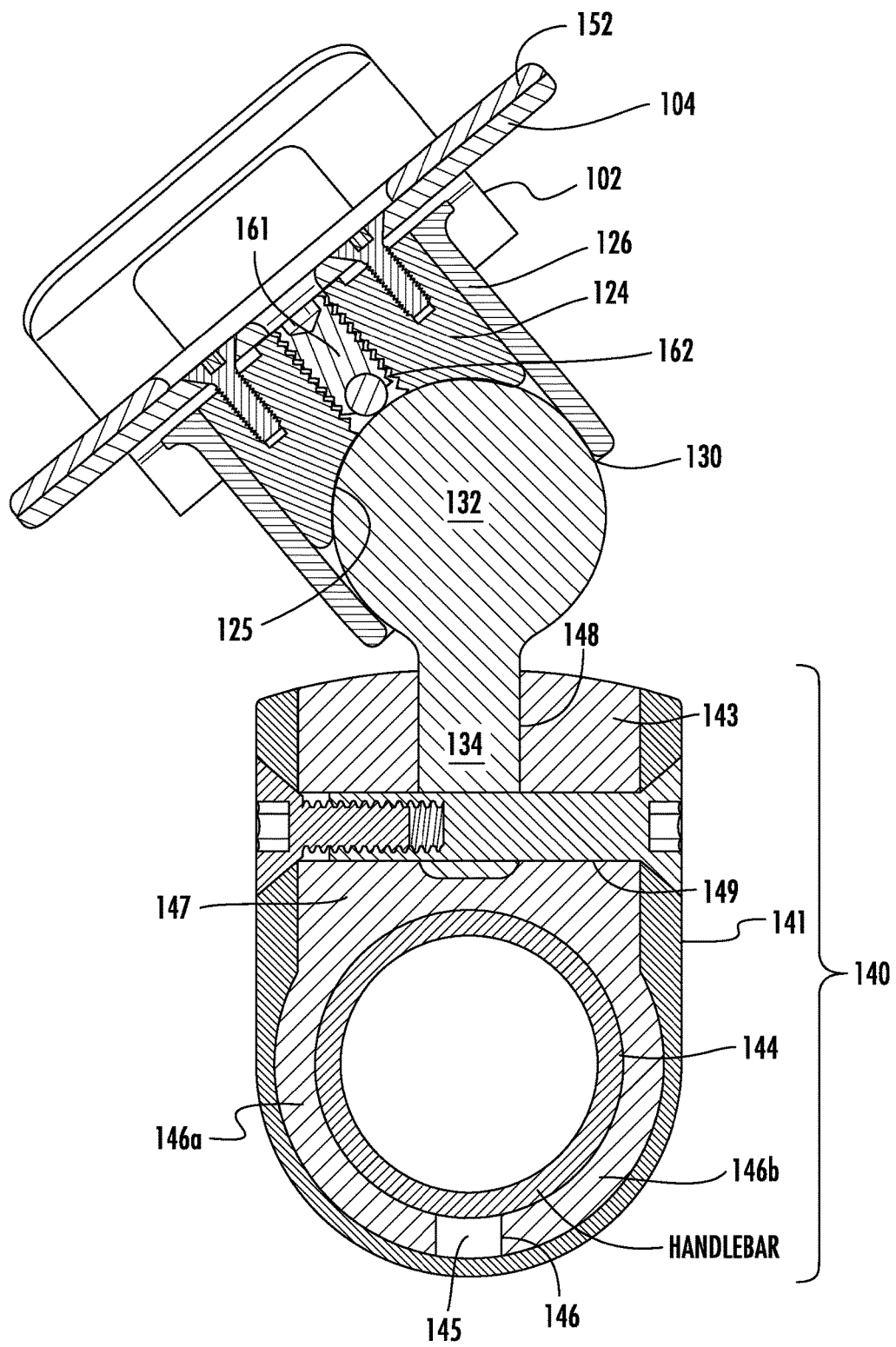
FIG. 5 illustrates a cross-sectional view of the mounting assembly of FIG. 1 taken along the C-C line shown in FIG. 1.

As shown in FIG. 5, a lower surface 125 of the plug 124 defines a semi-spherical indention. The indention receives a portion of a surface of the ball portion 132. A swivel set screw 161 is engaged through the plug 124 such that a first end 162 of the swivel set screw 161 engages the ball portion 132 and provides frictional contact therewith. The engagement of the swivel set screw 161 prevents unintentional rotational movement of the plug 124 about the ball portion 132.

The mounting assembly 100 further includes a mounting base 140. The mounting base 140 couples the mounting assembly 100 to a surface of the vehicle. For example, for mounting assemblies that are intended for use in motorcycles or other vehicles having handlebars, the mounting base 140 defines an opening for receiving a handlebar. As shown in FIGS. 1 through 5, the mounting base 140 includes a U-shaped mount wrap 141 and a spacer 143. The spacer 141 may be formed of aluminum, steel, or other suitable material. In the implementation shown, the spacer 143 is made of an elastomeric material, such as rubber or polyurethane rubber, and includes a base 147 and two arms 146a, 146b that extend from the base 147. The two arms 146a, 146b are arcuate shaped and define a first, circular shaped opening 144. The distal ends 148 of the arms 146a, 146b are spaced apart from each other and define a second opening 145. To couple the spacer 143 onto the handlebars, the distal ends 148 of the arms 146a, 146b are urged apart to allow the handlebar to pass through the second opening 145 and into the first opening 144. Once the handlebar is within the first opening 144, the distal ends 148 of the arms 146a, 146b move toward each other around the handlebar. The U-shaped mount wrap 141 is then disposed over the opening 145 and the spacer 143. The U-shaped mount wrap 141 prevents the arms 146a, 146b from moving away from each other once installed. In other implementations, the shape of the arms 146a, 146b and mount wrap 141 may be different to accommodate the cross-sectional shape of the handlebar or other surface to which the mounting assembly is to be coupled.

The base 147 of the spacer 143 further defines an opening 148 on an upper surface thereof for receiving the stem 134 of the ball joint 130 and an opening 149 extending through sides the base 143. The opening 149 through the sides of the base 147 aligns with an opening 137 defined through the stem 134 and openings 138 defined through distal ends 139a, 139b of the U-shaped mount wrap 141. One or more fasteners 151 are engaged within the aligned openings 137, 138, 149 to couple the stem 134 to the mounting base 140 and to couple the U-shaped mount wrap 141 and the spacer 143.

Once assembled, the socket 126, plug 124, base plate 104, and clamp plate 102 may be rotated together about the ball portion 132 relative to the stem 134.

Exemplary materials for the base plate 104 include aluminum, stainless steel, or other suitably rigid material. Exemplary materials for the clamp plate 102 include aluminum, stainless steel, or other suitably formable material that may be biased into the engagement position and moved into the non-engagement position upon application of a force sufficient to overcome the biasing force. The clamp plate 102 may further include a coating (e.g., a soft touch powder coating) or pad material (e.g., silicone, foam, or elastomeric material) on its first surface 112 and on the distal portions 111 of the engagement arms 108a, 108b.

Various implementations may include mounting assemblies that accommodate differently sized hand held electronic computing devices by adjusting the distance between the engagement arms 108a, 108b.

In addition, the mounting assembly 100 may be mounted onto the handlebars of motorcycles, and dimensions of one or more components of the mounting assembly 100 may be altered to accommodate different sized or shaped handlebars.

In other implementations, the stem of 134 may be coupled to the clamp plate 102 and base plate 104, and the plug 124 may be coupled to the mounting base 140.

Figure 8:
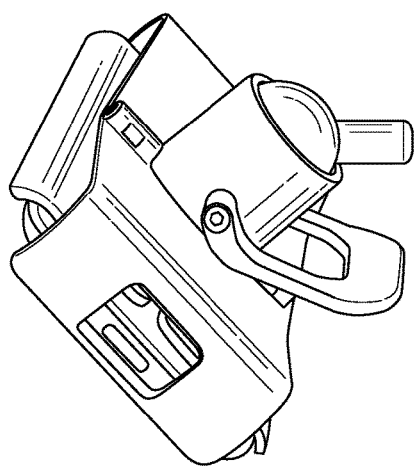
FIG. 8 illustrates an assembled, side perspective view of the mounting assembly in FIG. 6 for mounting with one of the mounting bases shown in FIGS. 9-11.
Figure 11:
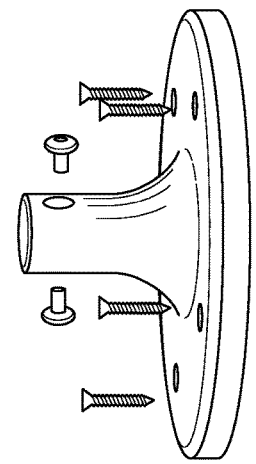
FIG. 11 illustrates a mounting base according to another implementation.
Figure 10:
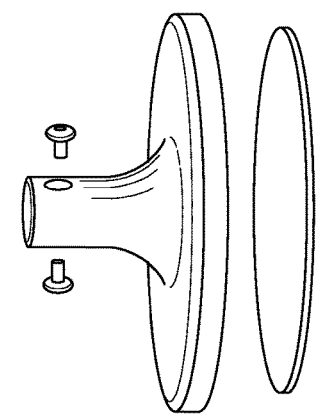
FIG. 10 illustrates a mounting base according to another implementation.
Figure 9:
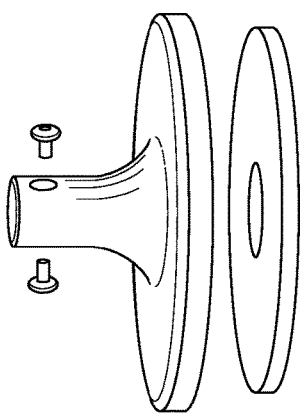
FIG. 9 illustrates a mounting base according to another implementation.

In addition, the assembly 100 may be mounted adjacent other types of mounting bases, such as a magnetic base (e.g., as shown in FIG. 9), an adhesive base (e.g., as shown in FIG. 10), or a fastener receiving base (e.g., as shown in FIG. 11), which may receive screws, nails, rivets, or other suitable fasteners to secure the mounting assembly to the vehicle. For example, as shown in FIG. 8, the mounting assembly does not include the mounting base 140. Instead, the stem 134 of the ball joint 130 is disposed within an opening defined by each base shown in FIGS. 9-11, and the stem 134 is coupled to the base via fasteners or other suitable fastening mechanism. Furthermore, the mounting bases shown in FIGS. 9-11 or others may be used to couple the mounting assembly to a surface of the vehicle, depending on the type of vehicle. Types of vehicles may include automobiles, all-terrain vehicles, golf carts, boats, etc. for example.

In other implementations, the mounting assembly may include two or more engagement arms.

Figure 6:
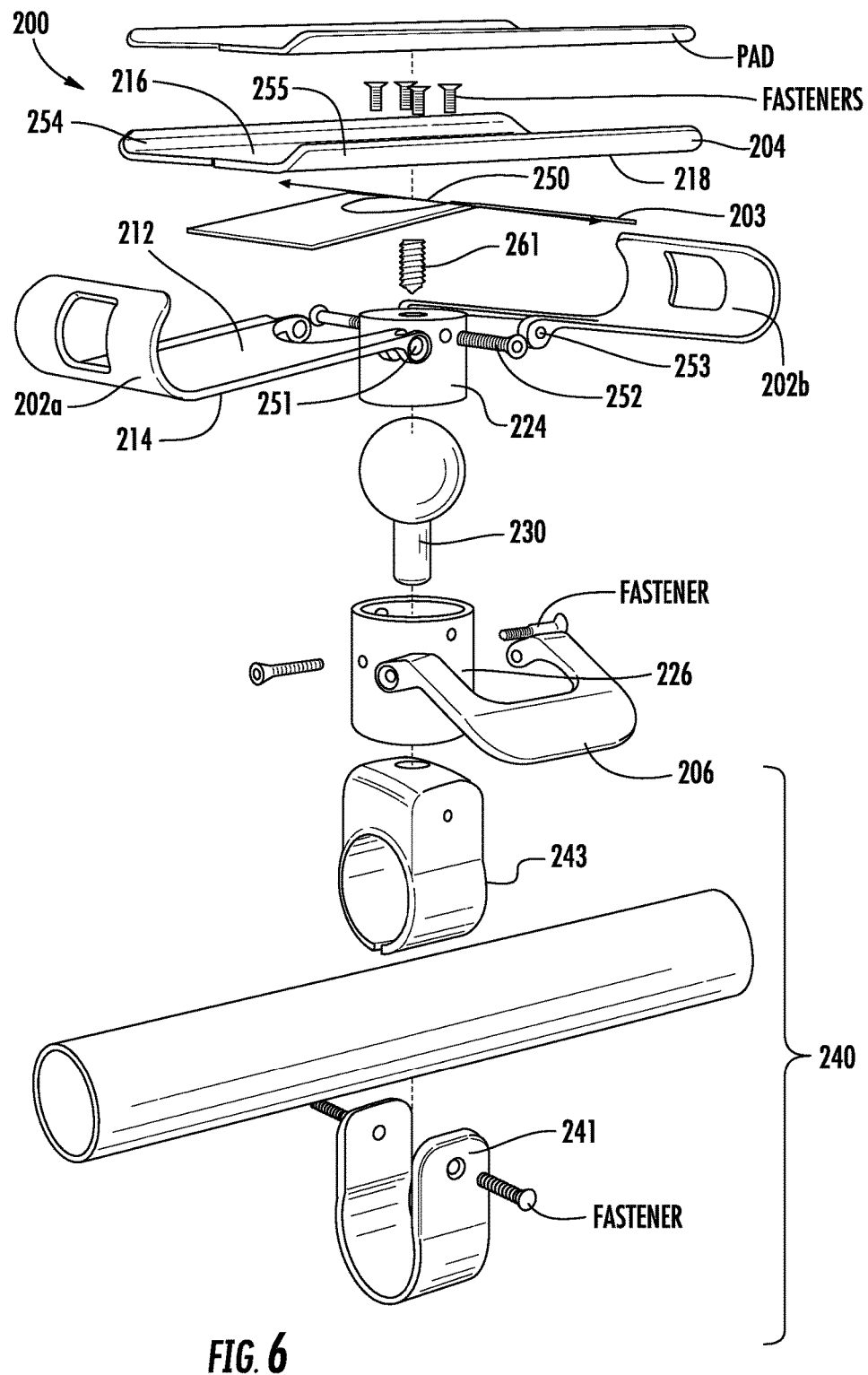
FIG. 6 illustrates an exploded view of a mounting assembly according to another implementation.
Figure 7:
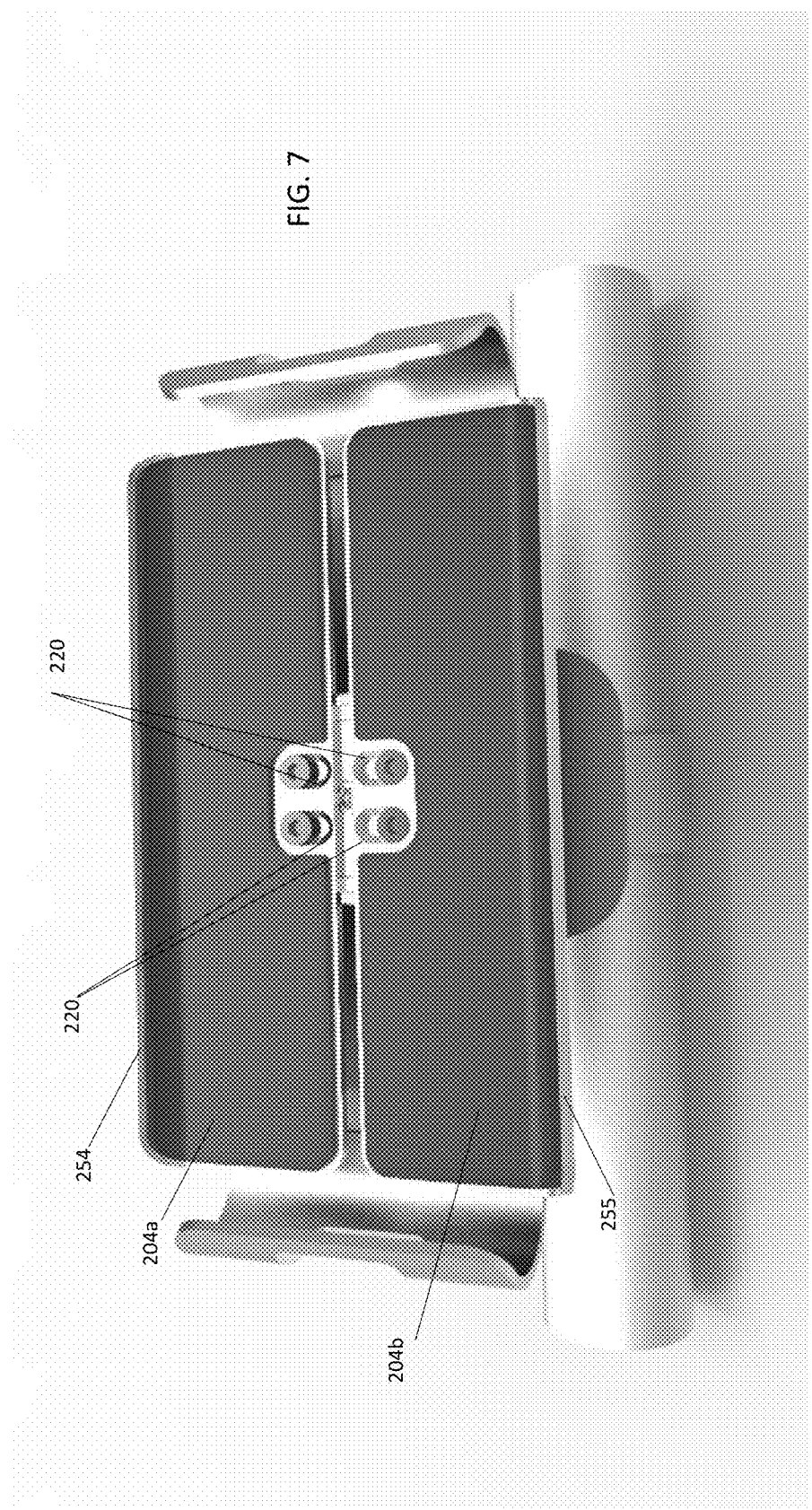
FIG. 7 illustrates an assembled, front perspective view of the mounting assembly in FIG. 6.

FIGS. 6 and 7 illustrate another implementation of a mounting assembly. The mounting assembly 200 is similar to the mounting assembly 100 described in relation to FIGS. 1 through 5, but the biasing mechanism for the clamp plate is different. In particular, the mounting assembly 200 includes clamp plate 202 and a separately formed spring plate 203, such as a spring steel plate. The clamp plate 202 is not necessarily made of a spring formed material. For example, the clamp plate 202 may include any suitably rigid material (e.g., metal, polymer, wood, etc.) since the spring plate 203 is providing the biasing force.

The spring plate 203 is disposed between the first surface 212 of the clamp plate 202 and the second surface 218 of the base plate 204. The spring plate 203 urges first 202a and second portions 202b of the clamp plate 202 away from the second surface 218 of the base plate 204, which causes the distal portions 211 of the engagement arms 208a, 208b to move closer to the first surface 216 of the base plate 204.

The first 202a and second portions 202b of clamp plate 202 are hingedly coupled together along a hinge axis 251, which is defined by adjacent edges of each portion 202a, 202b. The portions 202a, 202b are coupled by at least one fastener 252 (e.g., a screw or rod) that extends through openings 253 defined on each adjacent edge of each portion 202a, 202b. The fastener may also engage an opening defined in the plug 224 and/or the socket 226 to rotatably couple the portions 202a, 202b relative to the socket 226. As shown in FIG. 6, the spring plate 203 is sandwiched between the second surface 218 of the base plate 204 and the first surface 212 of the clamp plate 202, and a bend axis 250 of the spring plate 203 is parallel to hinge axis 251 of the portions 202a, 202b. In addition, the spring plate 203 may define one or more openings adjacent to or that span the bend axis to allow fasteners to extend from the base plate 204 through the opening and into openings in the plug 224 to couple the base plate 204 relative to the plug 224. A cam 206 is coupled to the socket 226 similarly to cam 106 described above to urge the clamp plate portions 202a, 202b into the non-engagement position.

In addition, the base plate 204 includes a first lip 254 and a second lip 255 extending from the first surface 216 of the base plate 204 adjacent opposite and spaced apart edges of the base plate 204. The edges from which the lips 254, 255 extend are parallel to each other and perpendicular to the axes that extend along proximal ends 109 of the engagement arms 108a, 108b. The lips 254, 255 may help further prevent the object being held between the base plate 204 and the distal portion 211 of the engagement arms 208a, 208b from slipping from the mounting assembly 200.

In other implementations, the clamp plate 202 may include a central portion that is disposed between the first 202a and second portions 202b. The first 202a and second portions 202b are hingedly coupled to opposite and spaced apart edges of the central portion.

Furthermore, as shown in FIG. 6, the base plate 204 includes a first portion 204a and a second portion 204b that are separately formed and coupled to the plug 224. Adjacent edges of the portions 204a, 204b define openings 220 for receiving fasteners to couple the portions 204a, 204b to the plug 224. The openings 220 are slot shaped to allow the user to adjust the distance between the adjacent edges to accommodate objects having variable dimensions between the lips 254, 255. However, in other implementations, the lips 254, 255 may not be included, the base plate 204 may be formed as one piece, and/or the distance between adjacent edges of the base plate portions 204a, 204b may not be adjustable.

The mounting base 240 is similar to mounting base 140 described above in relation to FIGS. 1-5 and includes spacer 243 and U-shaped mount wrap 241. Mounting assembly 200 also includes ball joint 230 to allow the plug 224 and the clamp plates 202a, 202b coupled to the plug 224 to swivel relative to the mounting base 240.

FIGS. 12 through 14 illustrate another implementation of a mounting assembly. The mounting assembly 300 shown in FIGS. 12 through 14 is similar to the mounting assemblies 100, 200 described above. However, the mounting assembly 300 includes a clamp plate 302 having four engagement arms 308a-d. Engagement arms 308a and 308b extend from a first edge of the clamp plate 302, and engagement arms 308c and 308d extend from a second edge of the clamp plate 302, wherein the first and second edges are opposite and spaced apart from each other. The distal ends 310 of arms 308a and 308c extend toward each other, and the distal ends 310 of arms 308b and 308d extend toward each other. The base plate 304 is disposed between first surface 312 of the clamp plate 302 and the distal ends 310, such that a first surface 316 of the base plate 304 faces the distal ends 310 and a second surface 318 of the base plate 304 faces the first surface 312 of the clamp plate.

In addition, to urge the base plate 304 toward the distal ends 310 of the engagement arms 308a-d, one or more helical springs 303 are disposed between the second surface 318 of the base plate 304 and the first surface 312 of the clamp plate 302. The springs 303 bias the base plate 304 away from the first surface 312 of the clamp plate 302. In some implementations, each spring 303 may be disposed around a respective post 305 that extends from the second surface 318 of the base plate 304 and through openings defined through the clamp plate 302. In other implementations, other types of springs may be used, such as, for example, leaf springs or spring steel plates. In addition, although the engagement arms 308a-d are shown as extending from longer edges of the clamp plate 302, in other implementations, the arms 308a-d may extend from the shorter edges of the clamp plate 302. And, the mounting assembly 300 may include two or more engagement arms, instead of the four shown in FIGS. 12 through 14.

FIGS. 15 through 20 illustrate another implementation of a mounting assembly. The mounting assembly 400 shown in FIGS. 15 through 20 is similar to the mounting assemblies 100, 200, 300 described above. The mounting assembly 400 includes an integrally formed clamp plate 402 having two engagement arms 408a, 408b. The engagement arms 408a, 408b each include a proximal end 409 integrally formed with the clamp plate 402 and a distal end 410 that is spaced apart from the proximal end 409. The proximal ends 409 are spaced apart and opposite each other, and the distal ends 410 are spaced apart from the first surface 412 of the clamp plate 402 and extend toward each other. Distal portions 411 of each engagement arm 408a, 408b are adjacent each distal end 410. The base plate 404 is disposed between the first surface 412 of the clamp plate 402 and the distal portion 411 of the engagement arms 408a, 408b. The first surface 416 of the base plate 404 faces the distal portions 411 of the engagement arms 408a, 408b, and the second surface 418 of the base plate 404 faces the first surface 412 of the clamp plate 402.

Figure 19:
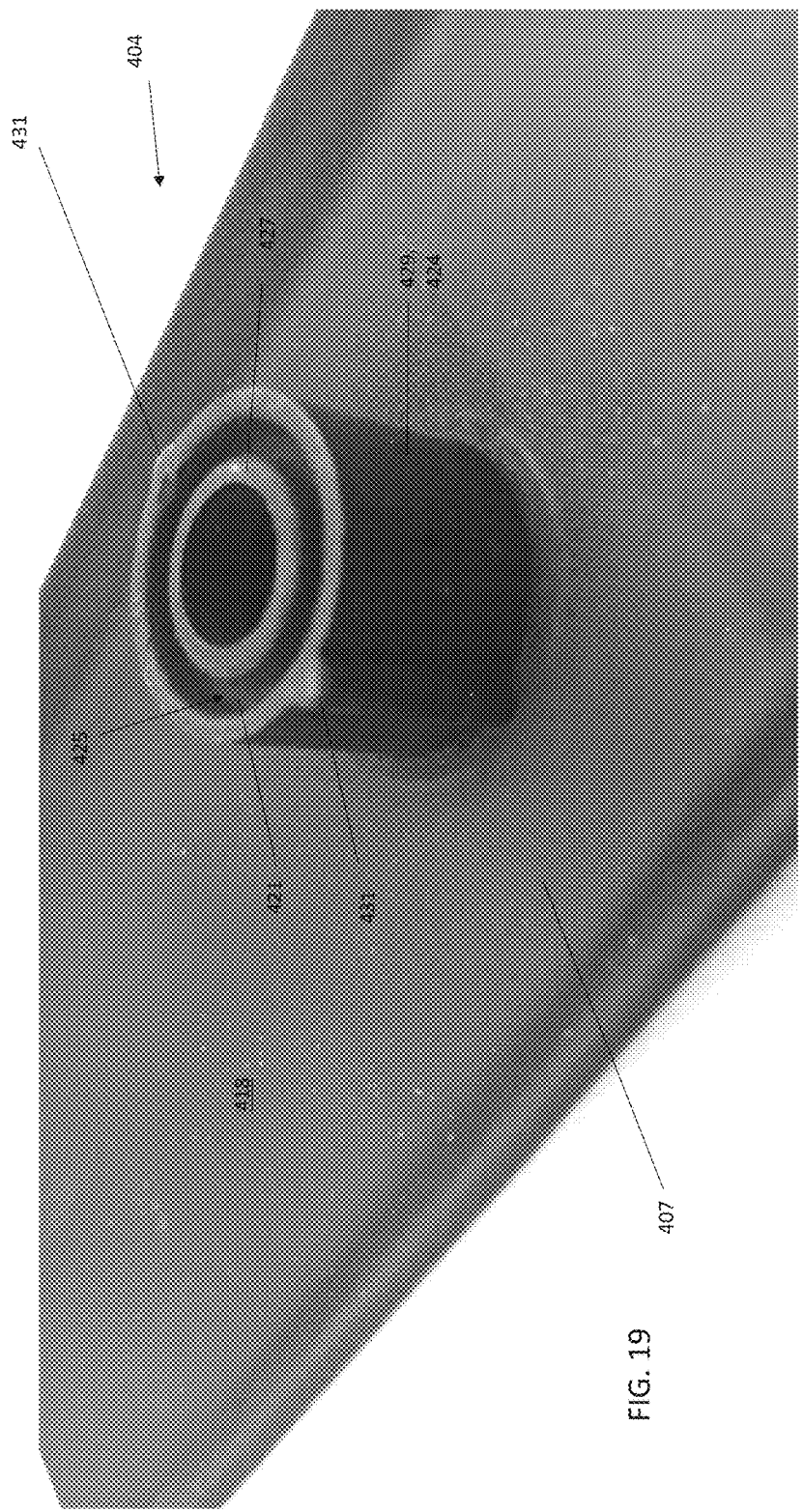
FIG. 19 illustrates a partial perspective view of the second surface of the base plate shown in FIG. 15.

The base plate 404 includes a plug 424 that extends from the second surface 418 of the base plate 404. The plug 424 is disposed adjacent a central portion 407 of the base plate 404. The plug 424 is cylindrically shaped and defines an annular recess 425. The annular recess 425 has a floor 421. The plug 424 also defines a central opening 427 that extends through the base plate 404 and plug 424. An outer surface 429 of the plug 424 includes one or more protrusions 431. The protrusions 431 extend radially from the outer surface 429 and axially along the outer surface 429. As shown in FIG. 19, the plug 424 includes two protrusions 431 that are disposed 180° from each other. However, in other implementations, the plug 424 may include one protrusion or multiple protrusions that are disposed at an angle of less than 180° from each other. In addition, side edges 455, 456 of the base plate 404 extend from the second surface 418 of the base plate 404, away from the distal ends 410 of the engagement arms 408a, 408b.

The mounting assembly 400 further includes a mounting body 422. The mounting body 422 includes a body portion 423 and a ball joint 430. The body portion 423 defines an annular recess 433 that has a floor 435. An axis D-D extends through a center of the annular recess 433 and the ball joint 430, and the floor 435 is spaced apart from the ball joint 430 along the axis D-D. The annular recess 433 also defines one or more recesses 432 that extend radially outwardly from the annular recess 433 and extend in the axial direction. The mounting body 422 also defines an annular flange 439 that extends radially outwardly from the outer surface of the body portion 423 at an end of the body portion 423 that is opposite the ball joint 430. And, an annular groove 449 is defined by the floor 435 of the annular recess 433. However, in other implementations, the annular groove 449 is not defined.

The clamp plate 402 defines an opening 442 adjacent a central portion 405 of the clamp plate 402.

To couple the mounting body 422 to the base plate 404 and the clamp plate 402, the body portion 423 of the mounting body 422 extends through the opening 442 of the clamp plate 402 such that the flange 439 extends over the first surface 412 of the clamp plate 402. One or more fasteners are engaged through one or more aligned openings defined in the clamp plate 402 adjacent the opening 442 and one or more aligned openings defined in the flange 439 to couple the clamp plate 402 and the mounting body 422.

The portion of the plug 424 that defines the annular recess 425 is disposed within the annular recess 433 of the mounting body 422. A spring 403, such as a helical spring, is disposed between the annular groove 449 defined by the floor 435 of the mounting body 422 and the floor 421 of the annular recess 425 of the plug 424. The spring 403 urges the base plate 404 toward the distal portion 411 of the engagement arms 408a, 408b and away from the first surface 412 of the clamp plate 402.

The one or more protrusions 431 extending from the plug 424 are engaged into the one or more axial recesses 432. The engagement of the protrusions 431 in the axial recesses 432 prevents rotational movement of the plug 424 and clamp plate 402 relative to the mounting body 422. In alternative implementations, the plug 424 and opening defined by the mounting body 422 may have a non-circular shape that prevents relative rotational movement of the plug 424 and mounting body 422.

In addition, the central opening 427 aligns with an opening 426 defined in the mounting body 422 radially inward of the annular recess 433. And, a distal portion of the central opening 427 has an inner diameter that is less than an inner diameter of a proximal portion of the central opening 427. A fastener 420 having a head 428 is engaged within the central opening 427 of the plug 424 and the central opening 426 defined in the mounting body 422. The head 428 has a diameter that is greater than the inner diameter of the distal portion of the central opening 427 of the plug. The head 428 prevents the base plate 404 from being removed from the annular recess 433 of the body portion 423.

Figure 20:
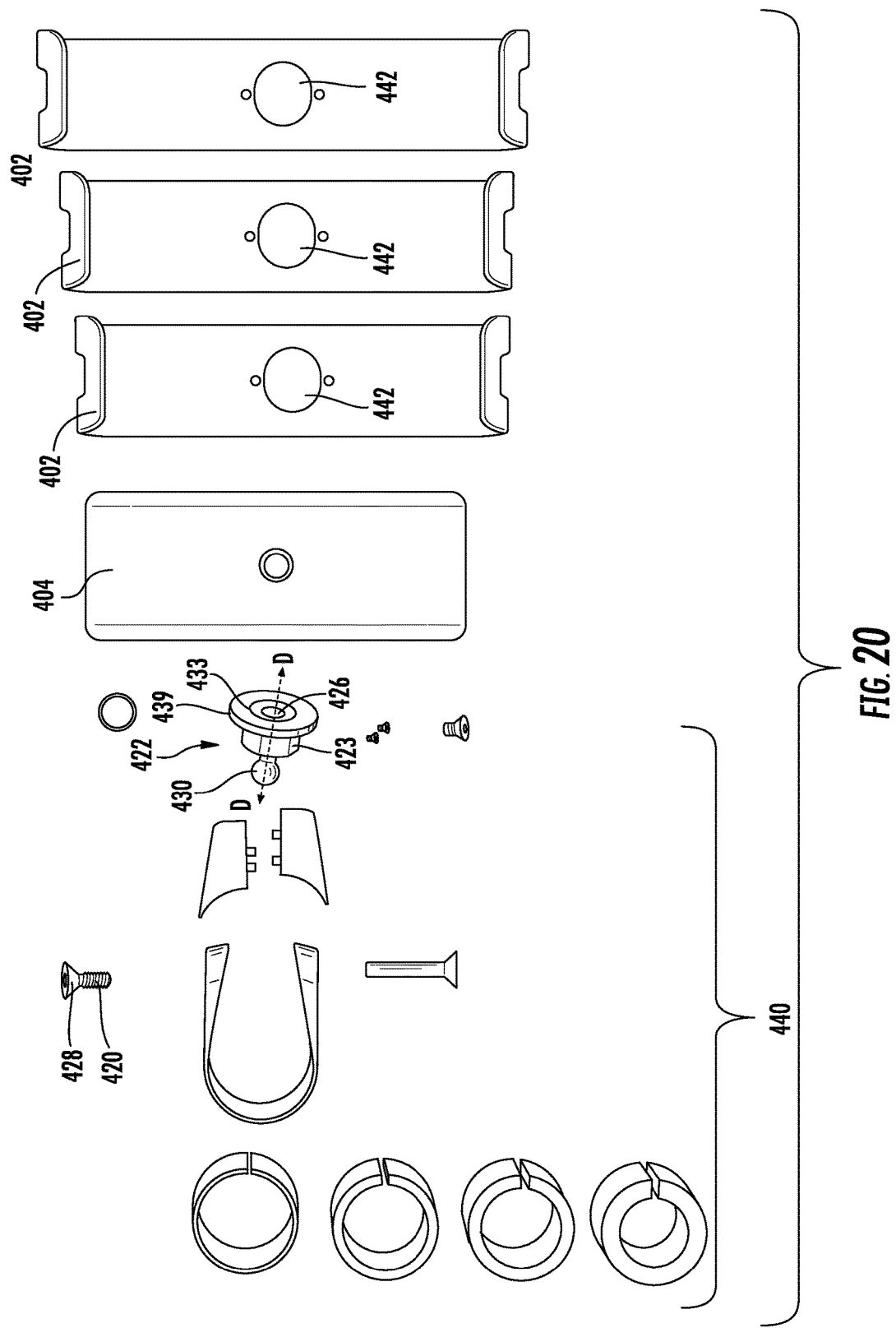
FIG. 20 illustrates another exploded view of the mounting assembly in FIG. 15.

As shown in FIG. 20, the spacer of the mounting base 440 includes two portions 443a, 443b. The two spacer portions 443a, 443b have adjacent faces 445 that couple together (e.g., with mating plugs and openings, clips, fasteners, adhesive, or other suitable fastening mechanisms). The adjacent faces 445 together define a semi-spherical opening 441 that receives the ball joint 430 and allows the ball joint 430 to rotate within the opening 441. The adjacent faces 445 also define an arcuate shaped opening 451 that receives a split ring collar 453 that extends around a handlebar. The split ring collar 453 defines a central opening, and an inner diameter of the opening may be selected depending on the diameter of the handlebar. Various sized split ring collars 453 may be provided for selection to fit a range of differently sized handlebars, as shown in FIG. 20. The outer diameter of the split ring collar 453 is the same for the options shown in FIG. 20 and corresponds to the radius of curvature of the arcuate shaped opening 451 defined by the faces 445. However, in other implementations, the outer diameter of the collar 453 may be different, and various sized spacer portions 443a, 443b may be available for selection to accommodate the selected collar 453.

In addition, the clamp plate 404 may be provided in different lengths to accommodate objects having varying lengths (e.g., different lengths of hand held electronic computing devices). The size of the base plate 404 and other components may remain the same. However, in other implementations, one or more components may be sized or shaped differently to accommodate differently sized or shaped objects.

Figure 21:
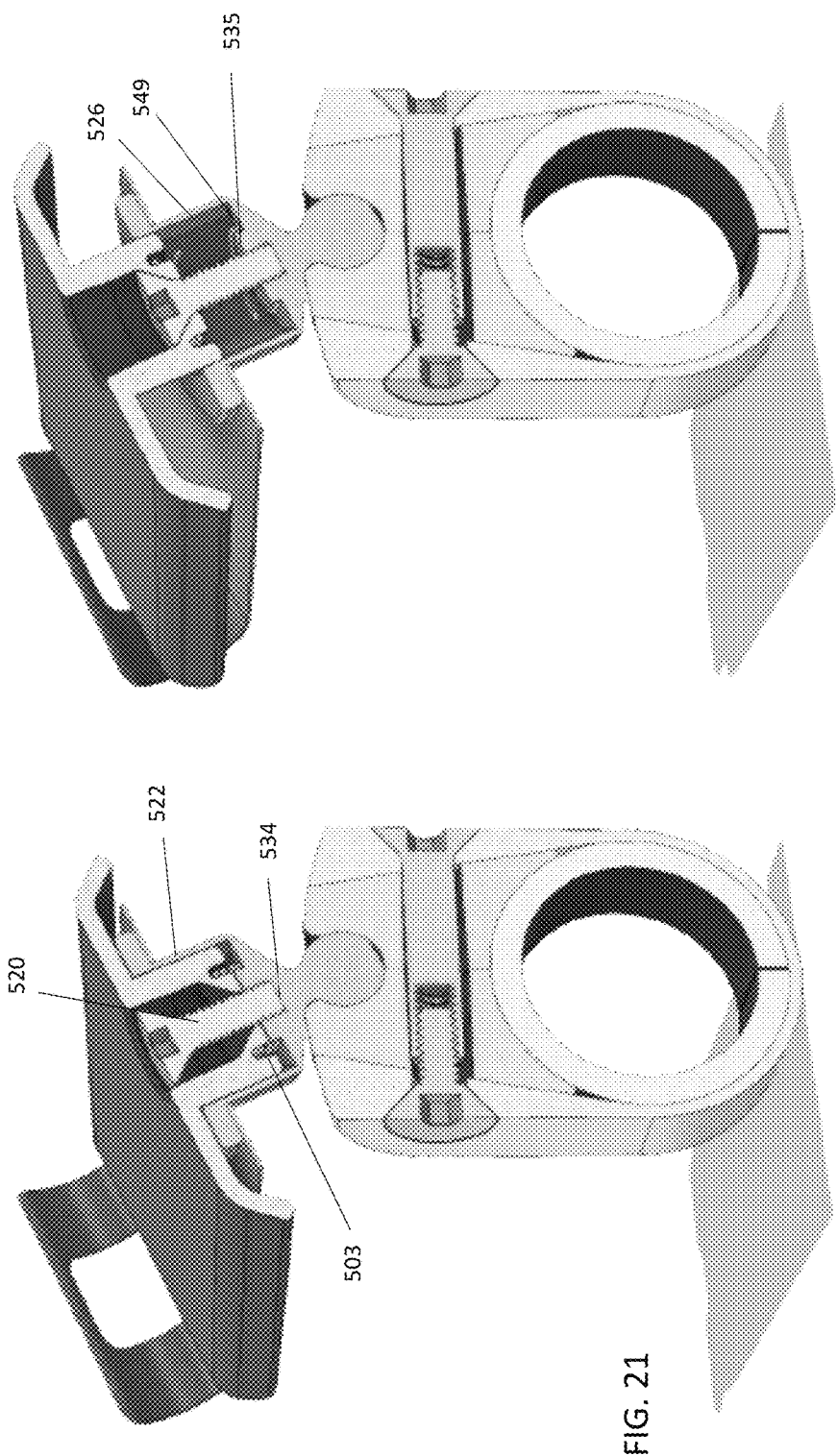
FIG. 21 illustrates a cross sectional perspective view of a mounting assembly according to another implementation.

In other implementations, the plug 424 and/or the mounting body 422 may not define an annular recess, and the spring 403 may be disposed between the floor of an opening defined by the plug 424 and/or mounting body 422 or distal ends thereof. For example, as shown in FIG. 21, the mounting body 522 defines an opening 526, and a floor 535 of the opening 526 defines an annular groove 549. One end of the spring 503 seats in the annular groove 549, and fastener 520 extends along the axis of the spring 503 and engages an opening 534 defined by the floor 535 of the opening 526.

Figure 22:
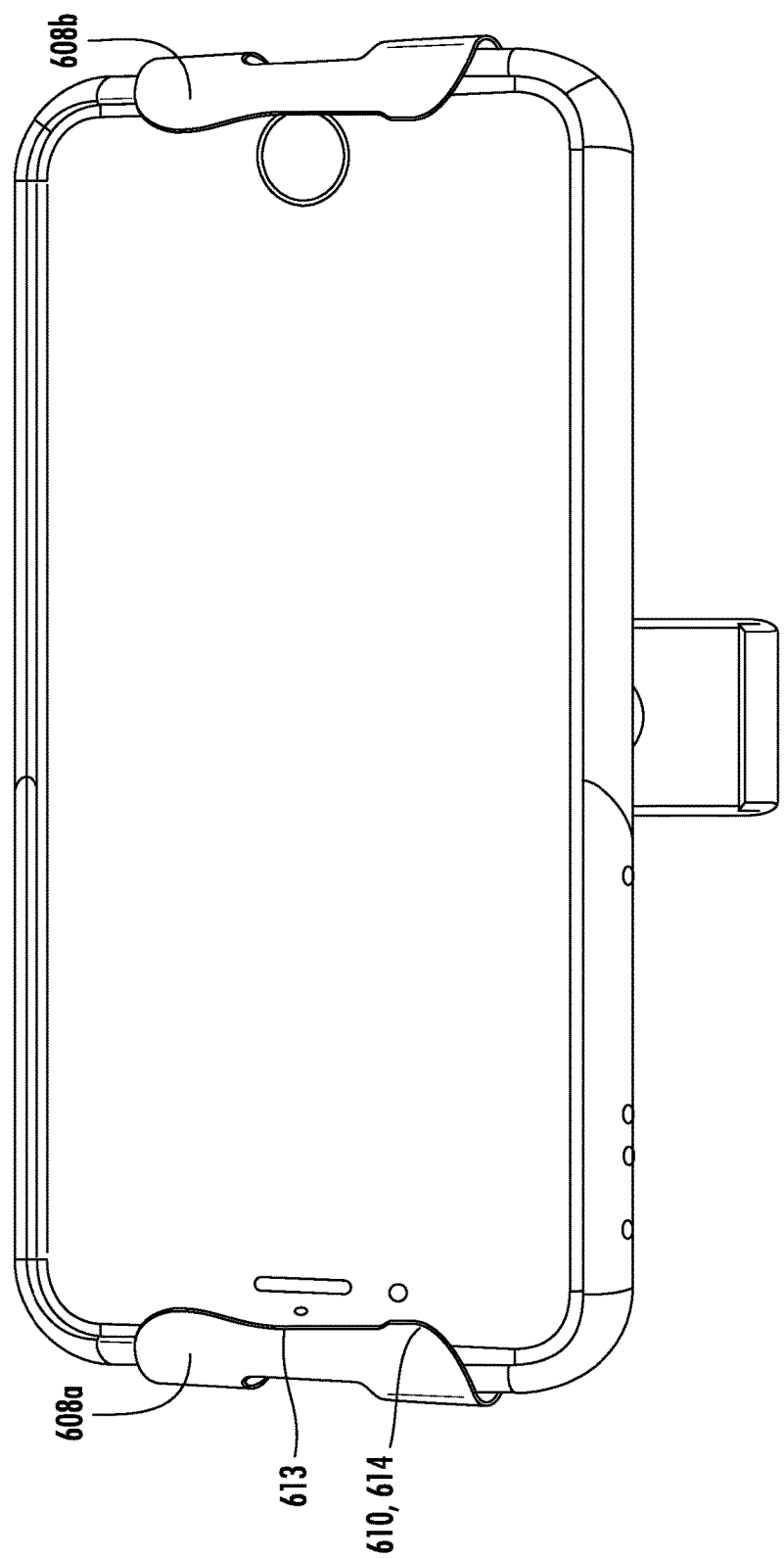
FIG. 22 illustrates an upper perspective view of a mounting assembly according to another implementation.

In the implementations shown in FIGS. 1-7 and 12-21, an edge of the distal end of each engagement arm is straight. However, in other implementations, the edge of each engagement arm may have an arcuate shaped portion. For example, the implementation shown in FIG. 22, the distal end 610 of each engagement arm 608a, 608b defines an arcuate shaped portion 613 along the edge 614 of the distal end 610. The arcuate shaped portion 613 allows a user to access more surface area of the object being held by the mounting assembly, such as a home button of a hand held electronic computing device.

In the implementations described above, the clamp plate 102, 202, 302, 402 and base plate 104, 204, 304, 404 have a rectangular shape. However, in other implementations, one or both of these plates may have an alternative suitable shape, such as a polygon, elliptical, or circular shape.

Various modifications of the assemblies, devices, and methods in addition to those shown and described herein are intended to fall within the scope of the appended claims. Further, while only certain representative assemblies, devices, and method steps disclosed herein are specifically described, other combinations of the assemblies, devices, and method steps are intended to fall within the scope of the appended claims, even if not specifically recited. Thus, a combination of steps, elements, components, or constituents may be explicitly mentioned herein. However, other combinations of steps, elements, components, and constituents are included, even though not explicitly stated. The term "comprising" and variations thereof as used herein is used synonymously with the term "including" and variations thereof and are open, non-limiting terms.

The invention claimed is:

1. A mounting assembly comprising:
   a clamp plate having a first surface and a second surface, wherein the first and second surfaces are opposite and spaced apart from each other;
   at least two engagement arms, each engagement arm having a proximal end and a distal end, wherein the proximal ends are coupled to the clamp plate and are spaced apart from and opposite each other, and the distal ends of the engagement arms are spaced apart from the first surface of the clamp plate and extend toward each other; and a base plate disposed between the distal ends of the engagement arms and the first surface of the clamp plate, the base plate having a first surface that faces the distal ends of the engagement arms and a second surface that faces the first surface of the clamp plate;

a mounting base for coupling the mounting assembly to a surface on or within a vehicle, an inner clamp, the inner clamp having a first clamp portion and a second clamp portion, the first and second clamp portions being coupled together along adjacent faces thereof, the first and second clamp portions defining an arcuate shaped end;

a split ring, the split ring defining a central opening and having an outer surface, and at least a portion of the outer surface being engagable with the arcuate shaped end of the inner clamp; and an outer clamp, the outer clamp being engagable around at least a portion of the split ring and the inner clamp to prevent the first and second clamp portions and the split ring from moving away from each other;

wherein a spring biases one of the first surface of the base plate or the distal ends of the engagement arms toward the other of the distal ends or the first surface of the base plate.

2. The mounting assembly of claim 1, further comprising at least one frictional material disposed on at least a portion of the first surface of the base plate, the frictional material having a static coefficient of friction relative to the object that is greater than a static coefficient of friction of the first surface of the base plate relative to the object.

3. The mounting assembly of claim 2, wherein the frictional material comprises a silicone pad, a foamed pad, rubber pad, or elastomeric pad.

4. The mounting assembly of claim 2, wherein the frictional material comprises a frictional coating.

5. The mounting assembly of claim 1, further comprising a swivel assembly, the swivel assembly comprising a ball and a socket that are rotatably coupled together, wherein one of the ball or socket are coupled to the clamp plate, and the other of the socket or ball are coupled to a mounting base.

6. The mounting assembly of claim 1, wherein the spring is disposed between the second surface of the base plate and a surface of the mounting assembly that is fixed relative to the clamp plate, the spring biasing the first surface of the base plate toward the distal ends of the engagement arms.

7. The mounting assembly of claim 6, wherein the spring comprises one or more helical springs.

8. The mounting assembly of claim 6, wherein the surface of the mounting assembly that is fixed relative to the clamp plate comprises a floor of a recess defined in a first side of a mounting body, the mounting body comprising a ball joint extending from a second side of the mounting body, wherein the ball joint and recess are spaced apart.

9. The mounting assembly of claim 8, wherein the recess is an annular shaped recess.

10. The mounting assembly of claim 9, wherein a plug extends from the second surface of the base plate, the plug defining a central opening and an annular recess spaced radially outwardly from the central opening, wherein the spring is disposed between a floor of the annular recess of the plug and the floor of the annular shaped recess of the mounting body.

11. The mounting assembly of claim 10, wherein an inner surface of a distal end of the plug has a diameter that is less than a diameter of the inner surface of a proximal end of the plug, the distal end of the plug defining the annular recess of the plug, and wherein a fastener having a head is coupled through the opening defined by the mounting body, the head having an outer diameter that is greater than the inner diameter of the distal end of the plug.

12. A mounting assembly comprising:
a clamp plate having a first surface and a second surface, wherein the first and second surfaces are opposite and spaced apart from each other;

at least two engagement arms, each engagement arm having a proximal end and a distal end, wherein the proximal ends are coupled to the clamp plate and are spaced apart from and opposite each other, and the distal ends of the engagement arms are spaced apart from the first surface of the clamp plate and extend toward each other; and a base plate disposed between the distal ends of the engagement arms and the first surface of the clamp plate, the base plate having a first surface that faces the distal ends of the engagement arms and a second surface that faces the first surface of the clamp plate, wherein a spring biases one of the first surface of the base plate or the distal ends of the engagement arms toward the other of the distal ends or the first surface of the base plate, wherein the spring is disposed between the second surface of the base plate and a surface of the mounting assembly that is fixed relative to the clamp plate, the spring biasing the first surface of the base plate toward the distal ends of the engagement arms, wherein the surface of the mounting assembly that is fixed relative to the clamp plate comprises a floor of a recess defined in a first side of a mounting body, the mounting body comprising a ball joint extending from a second side of the mounting body, wherein the ball joint and recess are spaced apart, and wherein a plug extends from the second surface of the base plate, and the spring is disposed between the plug and the floor of the recess.

13. The mounting assembly of claim 12, wherein the mounting base comprises:
an inner clamp, the inner clamp having a first clamp portion and a second clamp portion, the first and second clamp portions being coupled together along adjacent faces thereof, the first and second clamp portions defining an arcuate shaped end;

a split ring, the split ring defining a central opening and having an outer surface, and at least a portion of the outer surface being engagable with the arcuate shaped end of the inner clamp; and an outer clamp, the outer clamp being engagable around at least a portion of the split ring and the inner clamp to prevent the first and second clamp portions and the split ring from moving away from each other.

14. The mounting assembly of claim 12, wherein the spring comprises one or more helical springs.

15. The mounting assembly of claim 12, wherein the recess is an annular shaped recess.

16. The mounting assembly of claim 12, further comprising at least one frictional material disposed on at least a portion of the first surface of the base plate, the frictional material having a static coefficient of friction relative to the object that is greater than a static coefficient of friction of the first surface of the base plate relative to the object.

17. The mounting assembly of claim 16, wherein the frictional material comprises a silicone pad, a foamed pad, rubber pad, or elastomeric pad.

18. The mounting assembly of claim 16, wherein the frictional material comprises a frictional coating.

19. A mounting assembly comprising:
a clamp plate having a first surface and a second surface, wherein the first and second surfaces are opposite and spaced apart from each other;
at least two engagement arms, each engagement arm having a proximal end and a distal end, wherein the proximal ends are coupled to the clamp plate and are spaced apart from and opposite each other, and the distal ends of the engagement arms are spaced apart from the first surface of the clamp plate and extend toward each other;
a base plate disposed between the distal ends of the engagement arms and the first surface of the clamp plate, the base plate having a first surface that faces the distal ends of the engagement arms and a second surface that faces the first surface of the clamp plate; and
a mounting base,
wherein a spring biases one of the first surface of the base plate or the distal ends of the engagement arms toward the other of the distal ends or the first surface of the base plate,
wherein the spring is disposed between the second surface of the base plate and a surface of the mounting assembly that is fixed relative to the clamp plate, the spring biasing the first surface of the base plate toward the distal ends of the engagement arms,
wherein the surface of the mounting assembly that is fixed relative to the clamp plate comprises a floor of a recess defined in a first side of a mounting body, the mounting body comprising a ball joint extending from a second side of the mounting body, wherein the ball joint and recess are spaced apart, and
wherein the mounting base defines a semi-spherical opening for receiving the ball joint therein.

20. The mounting assembly of claim 19, wherein the spring comprises one or more helical springs.

21. The mounting assembly of claim 19, wherein the recess is an annular shaped recess.

22. The mounting assembly of claim 19, wherein a plug extends from the second surface of the base plate, the plug defining a central opening and an annular recess spaced radially outwardly from the central opening, wherein the spring is disposed between a floor of the annular recess of the plug and the floor of the annular shaped recess of the mounting body.

23. The mounting assembly of claim 19, wherein the mounting base comprises:
an inner clamp, the inner clamp having a first clamp portion and a second clamp portion, the first and second clamp portions being coupled together along adjacent faces thereof, the first and second clamp portions defining an arcuate shaped end;
a split ring, the split ring defining a central opening and having an outer surface, and at least a portion of the outer surface being engagable with the arcuate shaped end of the inner clamp; and
an outer clamp, the outer clamp being engagable around at least a portion of the split ring and the inner clamp to prevent the first and second clamp portions and the split ring from moving away from each other.

24. The mounting assembly of claim 19, further comprising at least one frictional material disposed on at least a portion of the first surface of the base plate, the frictional material having a static coefficient of friction relative to the object that is greater than a static coefficient of friction of the first surface of the base plate relative to the object.

25. The mounting assembly of claim 24, wherein the frictional material comprises a silicone pad, a foamed pad, rubber pad, or elastomeric pad.

26. The mounting assembly of claim 24, wherein the frictional material comprises a frictional coating.

27. A mounting assembly comprising:
a clamp plate having a first surface and a second surface, wherein the first and second surfaces are opposite and spaced apart from each other;
at least two engagement arms, each engagement arm having a proximal end and a distal end, wherein the proximal ends are coupled to the clamp plate and are spaced apart from and opposite each other, and the distal ends of the engagement arms are spaced apart from the first surface of the clamp plate and extend toward each other; and
a base plate disposed between the distal ends of the engagement arms and the first surface of the clamp plate, the base plate having a first surface that faces the distal ends of the engagement arms and a second surface that faces the first surface of the clamp plate,
wherein a spring biases one of the first surface of the base plate or the distal ends of the engagement arms toward the other of the distal ends or the first surface of the base plate,
wherein the spring is disposed between the second surface of the base plate and a surface of the mounting assembly that is fixed relative to the clamp plate, the spring biasing the first surface of the base plate toward the distal ends of the engagement arms,
wherein the surface of the mounting assembly that is fixed relative to the clamp plate comprises a floor of a recess defined in a first side of a mounting body, the mounting body comprising a ball joint extending from a second side of the mounting body, wherein the ball joint and recess are spaced apart, and
wherein the mounting body comprises a flange that extends radially outwardly from the mounting body adjacent the first side of the mounting body.

28. The mounting assembly of claim 27, wherein the mounting body extends through an opening defined in a central portion of the clamp plate, and the flange is disposed adjacent the first surface of the clamp plate.

29. The mounting assembly of claim 27, wherein the spring comprises one or more helical springs.

30. The mounting assembly of claim 27, wherein the recess is an annular shaped recess.

31. The mounting assembly of claim 27, wherein a plug extends from the second surface of the base plate, the plug defining a central opening and an annular recess spaced radially outwardly from the central opening, wherein the spring is disposed between a floor of the annular recess of the plug and the floor of the annular shaped recess of the mounting body.

32. The mounting assembly of claim 27, wherein the mounting base comprises:
an inner clamp, the inner clamp having a first clamp portion and a second clamp portion, the first and second clamp portions being coupled together along adjacent faces thereof, the first and second clamp portions defining an arcuate shaped end;
a split ring, the split ring defining a central opening and having an outer surface, and at least a portion of the outer surface being engagable with the arcuate shaped end of the inner clamp; and an outer clamp, the outer clamp being engagable around at least a portion of the split ring and the inner clamp to prevent the first and second clamp portions and the split ring from moving away from each other.

33. The mounting assembly of claim 27, further comprising at least one frictional material disposed on at least a portion of the first surface of the base plate, the frictional material having a static coefficient of friction relative to the object that is greater than a static coefficient of friction of the first surface of the base plate relative to the object.

34. The mounting assembly of claim 33, wherein the frictional material comprises a silicone pad, a foamed pad, rubber pad, or elastomeric pad.

35. The mounting assembly of claim 33, wherein the frictional material comprises a frictional coating.

\* \* \* \* \*